United States Patent [19]
Kitano et al.

[11] Patent Number: 4,887,104
[45] Date of Patent: * Dec. 12, 1989

[54] ELECTROOPTICAL LIGHT SHUTTER DEVICE AND PRINTER APPARATUS USING SAME

[75] Inventors: Hirohisa Kitano, Osaka; Itaru Saito, Hyogo; Kouichi Shingaki; Ken Matsubara, both of Osaka; Tomohiko Masuda, Hyogo, all of Japan

[73] Assignee: Minolta Camera Kabushiki Kaisha, Osaka, Japan

[*] Notice: The portion of the term of this patent subsequent to Aug. 8, 2006 has been disclaimed.

[21] Appl. No.: 120,949

[22] Filed: Nov. 16, 1987

[30] Foreign Application Priority Data

| Nov. 19, 1986 | [JP] | Japan | 61-276328 |
| Dec. 26, 1986 | [JP] | Japan | 61-314396 |
| Feb. 2, 1987 | [JP] | Japan | 62-22920 |
| Feb. 2, 1987 | [JP] | Japan | 62-22921 |
| Aug. 3, 1987 | [JP] | Japan | 62-194722 |
| Aug. 3, 1987 | [JP] | Japan | 62-194721 |
| Sep. 21, 1987 | [JP] | Japan | 62-238026 |

[51] Int. Cl.$^4$ .............................................. G02F 1/03
[52] U.S. Cl. ................................... 350/355; 350/392; 350/374
[58] Field of Search ............... 350/355, 356, 374, 384, 350/392, 393

[56] References Cited

U.S. PATENT DOCUMENTS

| 3,806,228 | 4/1974 | Imagawa et al. | 350/393 X |
| 4,596,992 | 6/1986 | Hornbeck | 350/356 X |
| 4,607,917 | 8/1986 | Ebner et al. | 350/392 |
| 4,707,081 | 11/1987 | Mir | 350/388 |
| 4,722,597 | 2/1988 | Takubo et al. | 350/387 |
| 4,765,721 | 8/1988 | Agostinelli et al. | 350/392 X |
| 4,766,445 | 8/1988 | Springer | 350/356 X |

FOREIGN PATENT DOCUMENTS

| 52-8842 | 1/1977 | Japan . |
| 60-159722 | 8/1985 | Japan . |
| 60-170828 | 9/1985 | Japan . |
| 61-38927 | 2/1986 | Japan . |
| 61-90127 | 5/1986 | Japan . |
| 1534027 | 11/1978 | Switzerland . |

Primary Examiner—Eugene R. Laroche
Assistant Examiner—Nathan W. McCutcheon
Attorney, Agent, or Firm—Price, Gess & Ubell

[57] ABSTRACT

An electrooptical light shutter device for use in an optical printer apparatus, comprising a number of shutter elements arrange in the form of at least one linear array, each of the shutter elements having an electrooptical effect, a polarizer disposed on a light-incoming side of the array of the shutter elements, and an analyzer disposed on a light-outgoing side of the array of the shutter elements, wherein the shutter elements have respective shutter windows through which light is to be passed selectively and the shutter windows are arranged to be overlapped by one another in a direction substantially perpendicular to the direction in which the shutter elements are arranged.

34 Claims, 28 Drawing Sheets

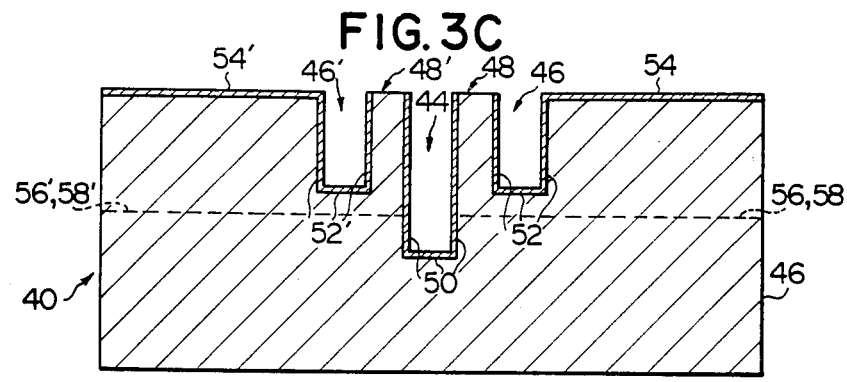
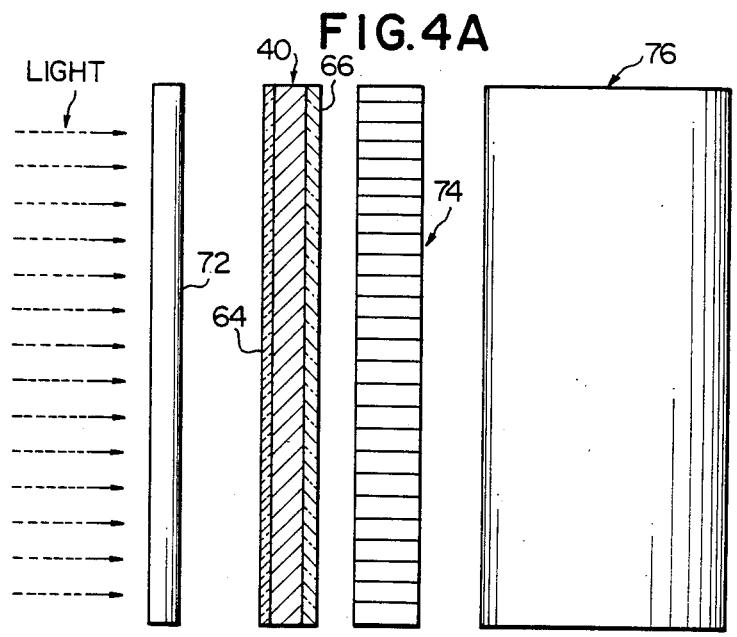
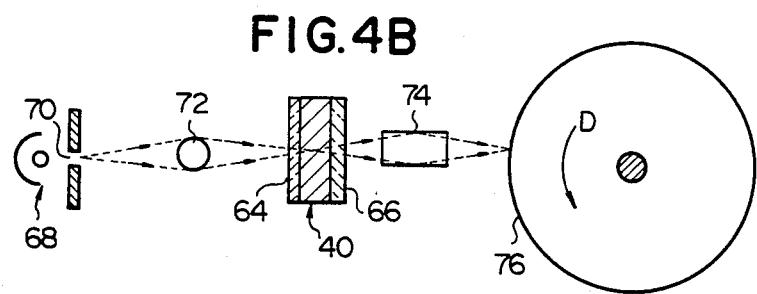

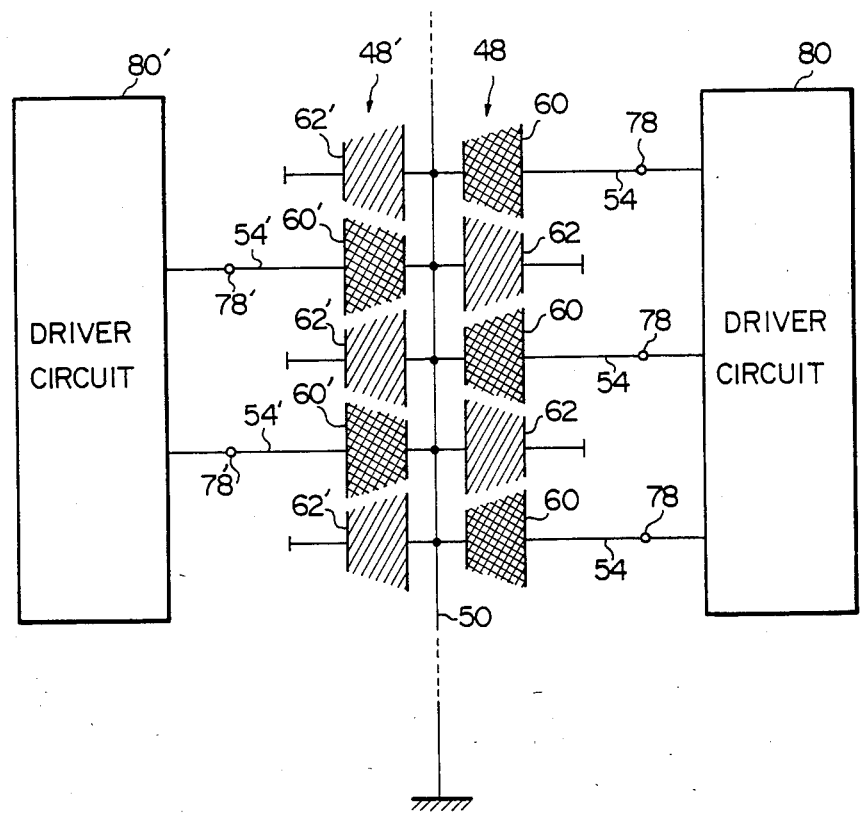

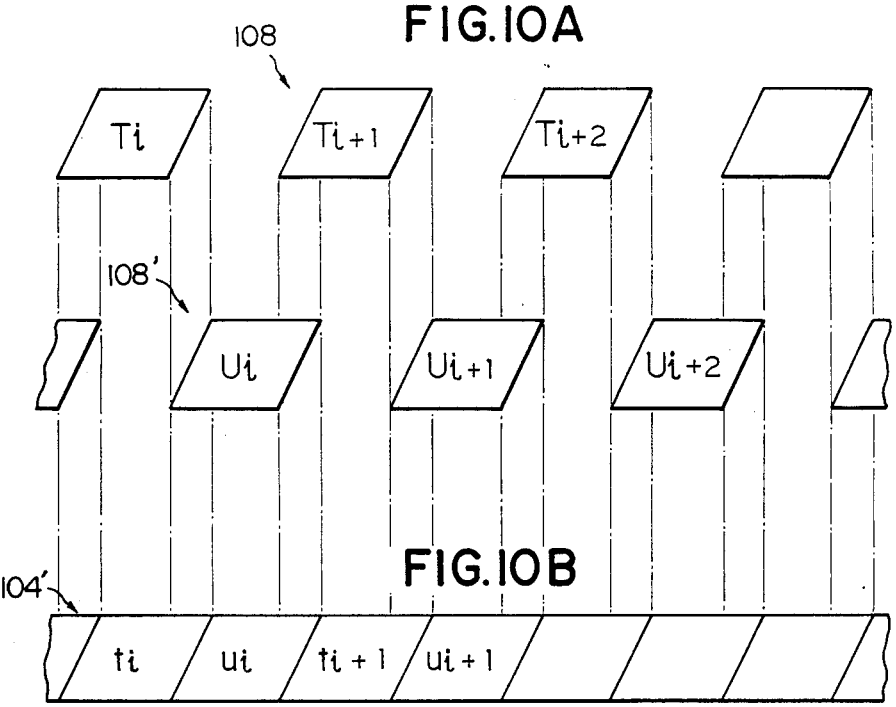
FIG.10A
FIG.10B
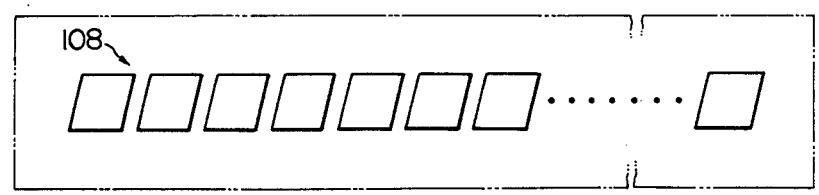
FIG.11

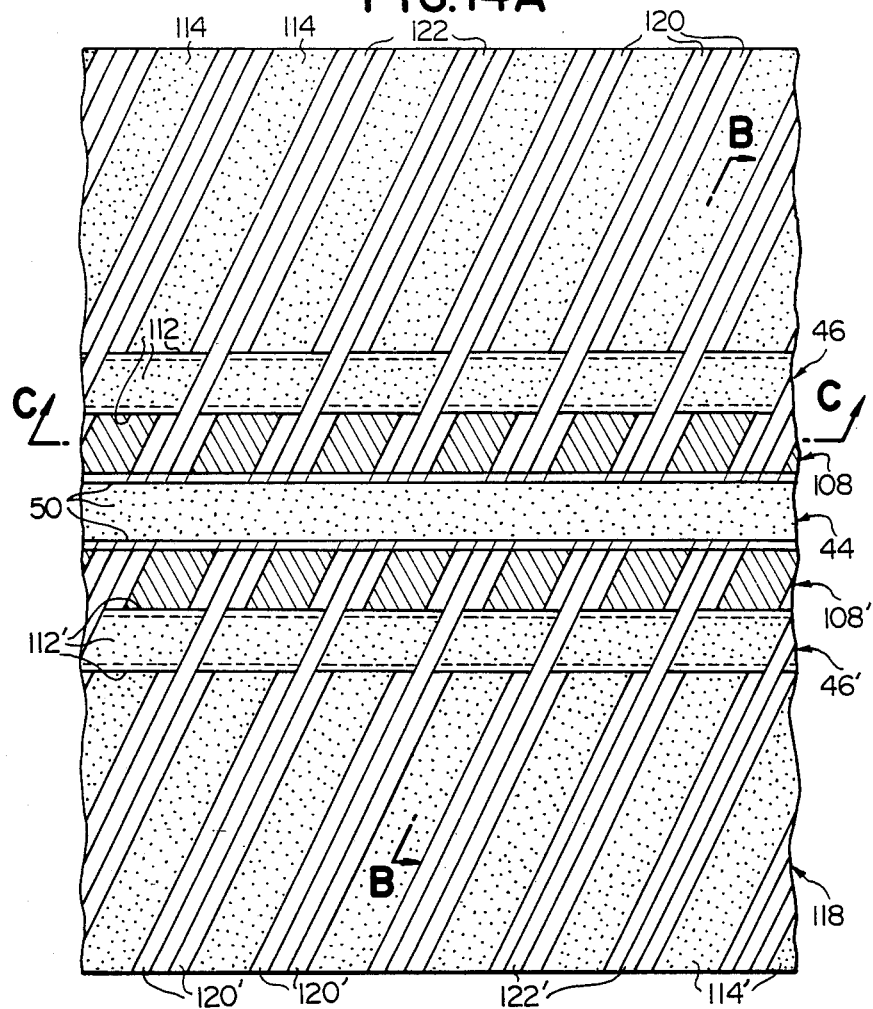

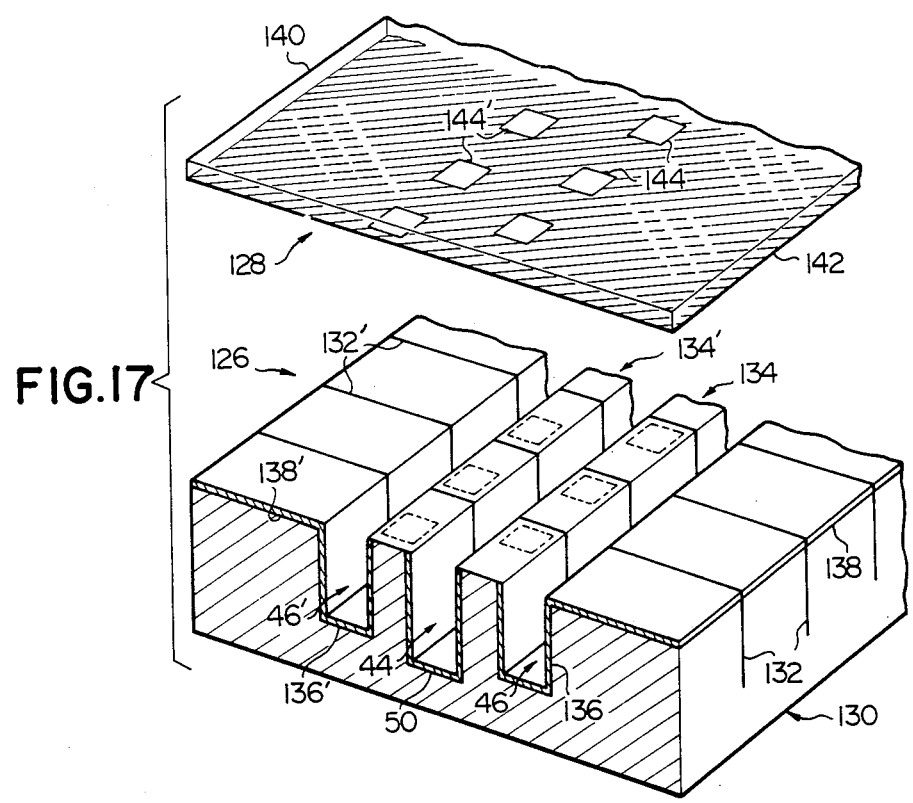
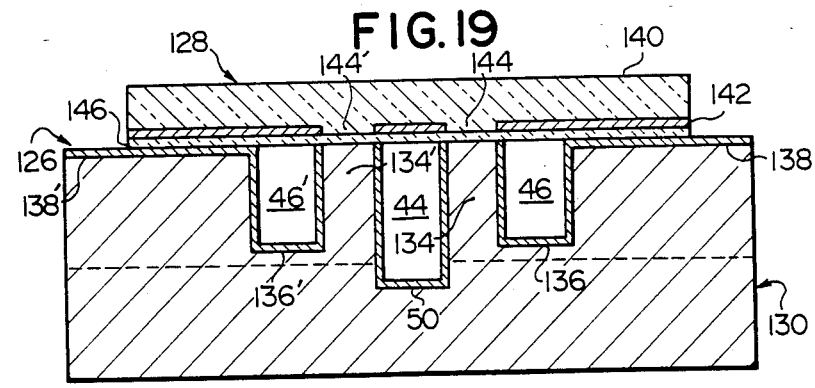

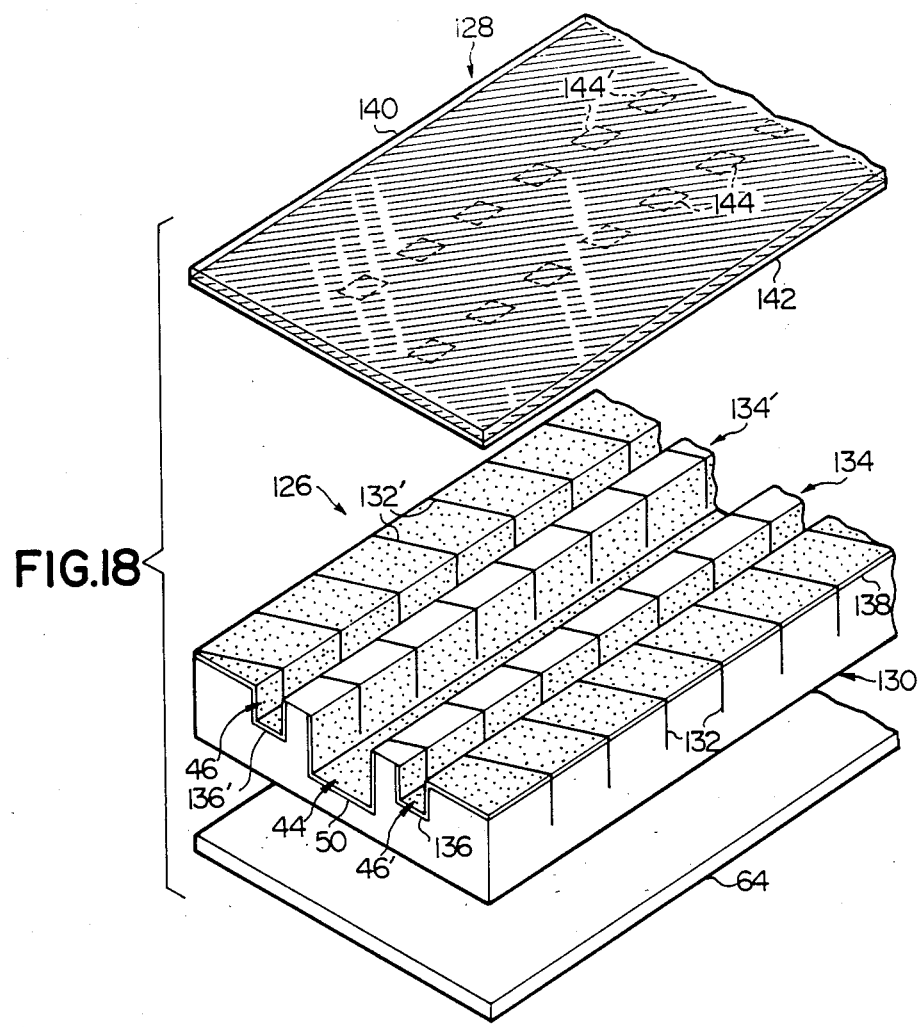

ELECTROOPTICAL LIGHT SHUTTER DEVICE AND PRINTER APPARATUS USING SAME

FIELD OF THE INVENTION

The present invention relates to an electrooptical light shutter device and, more particularly, to an electrooptical light shutter device using an array of a light-transmissive substance which has a prominent electrooptical effect particularly known as the Kerr effect. Typical of such a substance is the sintered lanthanum-modified lead zirconate titanate or PLZT ceramic $(Pb,La)(Zr,Ti)O_3$ which is known to have an electrically controllable light-transmissivity in combination with a polarizer and an analyzer and which finds typical practical applications in electrooptical light shutter devices. Electrooptical light shutter arrays using PLZT ceramics are now used for various optoelectronic devices such as optoelectronic modulators, electrooptical printers, high-speed optical data recorders, optical scanners, and optoelectronic attenuators. Examples of the prior-art light shutter arrays of such PLZT electrooptical shutter devices are disclosed in Japanese Provisional Patent Publications Nos. 52-008842, 60-159722, 60-170828 (or 61-038927) and 61-038927.

BACKGROUND OF THE INVENTION

FIG. 1A of the drawings schematically shows a single-row light shutter array, which is taught in Japanese Provisional Patent Publication Nos. 60-159722 or 60-170828. The light shutter array consists of a series of shutter elements $P_1, P_2, P_3, \ldots P_n$ arranged in a single row and may be used in an electrooptical printer apparatus using a photo-sensitive drum (not shown). The shutter elements $P_1, P_2, P_3, \ldots P_n$ are located with respect to the drum so that a single-row pattern of pixels $p_1, p_2, p_3, \ldots p_n$ as shown in FIG. 1B may be projected onto the peripheral surface of the drum.

FIG. 2A shows an improved version of such a prior-art light shutter array which is experimentally fabricated in private by Applicant and is of the dual-row type consisting of two parallel rows of shutter elements, one row consisting of shutter elements $P_1, P_2, P_3, \ldots P_n$ and the other row consisting of shutter elements $Q_1, Q_2, Q_s, \ldots Q_n$. The dual-row light shutter array as shown in FIG. 2A is advantageous over an array of the single-row type in that electrode segments can be easily connected to terminals of a control circuit with no consequent reduction in the resolving power. Only a set of alternative ones of the shutter elements is to be put to use with the other set of alternative shutter elements left out of use in each of the two rows so that, in effect, only the shutter elements which are located in staggering relationship between the two parallel rows may be selected for use. In the dual-row shutter element configuration shown in FIG. 2C, it is assumed that only the shutter elements $P_1, P_3, \ldots$ alternately arranged in the first row are to be put to use and, likewise, only the shutter elements $Q_2, Q_4, \ldots$ alternately arranged in the second row are to be put to use. The other set of alternately arranged shutter elements $P_2, P_4, \ldots$ of the first row and the other set of alternately arranged shutter elements $Q_1, Q_3, \ldots$ of the second row are left out of use.

Such a dual-row light shutter array may also be used in an electrooptical printer apparatus using a photo-sensitive drum (not shown). In this instance, the shutter elements selected out of the alternate shutter elements $P_1, P_3, \ldots$ of the first row are activated at a controlled timing and the shutter elements selected out of the alternate shutter elements $Q_2, Q_4, \ldots$ of the second row are activated at a predetermined time interval after the shutter elements of the first row have been activated. The photo-sensitive drum is driven for rotation at a speed selected so that beams of light passed through the selected ones of the shutter elements $P_1, P_3, \ldots$ of the first row and beams of light passed through the selected ones of the shutter elements $Q_2, Q_4, \ldots$ of the second row are allowed to reach the peripheral surface of the drum along a single line extending on the drum surface. The two rows of alternate shutter elements being activated with a predetermined time lag therebetween, a single-row pattern composed of the pixels $p_1, q_2, p_3, q_4, \ldots$ may thus be produced on the photo-sensitive drum of the printer apparatus as shown in FIG. 2B.

The single-row or dual-row light shutter array of the described type has a problem in that the single-row pattern of the pixels $p_1, p_2, p_3, \ldots p_n$ (FIG. 1B) or $p_1, q_2, p_3, q_4, \ldots$ (FIG. 2B) has gaps between the adjacent pixels produced on the photo-sensitive drum of the printer apparatus as will be seen from FIG. 1B or FIG. 2B. These gaps between the pixels produced on the drum have resulted from the gaps between the shutter elements of each of the rows in the light shutter array and result in recurring discontinuities in the generally linear pixel pattern. A pixel pattern with such discontinuities will significantly impair the aesthetic quality of the image to be printed or otherwise formed.

Another problem inherent in a conventional light shutter array of the described type is that a beam of light once admitted into a shutter element may be allowed out of the shutter element into another shutter element and cause a "crosstalk" between adjacent shutter elements of the light shutter array. An occurrence of such a crosstalk would impair the contrast of the images to be produced and is objectionable from the view point of producing an output image with a satisfactory degree of contrast.

In the meantime, a conventional light shutter array has generally been of the flat-electrode type which is coated with a control and lead electrode pattern applied to the surface of a PLZT substrate. Problems have however been encountered in a light shutter array of this flat-electrode type in that the device requires an unduly high driving voltage and may fail to operate properly due to a "crosstalk" which may occur between adjacent electrodes, and that the response characteristics of the device are rather insufficient.

With a view to obviating these problems, an advanced light shutter array has been proposed which has the individual shutter elements separated in block form from one another with a number of grooves cut into the substrate by the use of a mechanical cutting tool such as a dicing saw having a diamond cutter blade. Examples of a light shutter device of this type include the single-row shutter array disclosed in the named Japanese Provisional Patent Publication No. 61-38927 and the dual-row device which has been proposed by Applicant. Tests have been conducted with light shutter devices of these types to investigate into the optical performance characteristics of the devices. These tests have revealed that stresses are created in edge portions of the shutter elements when the grooves to separate the elements are being cut into the substrate. Such stresses remain throughout the use of the device and are responsible for the occurrence of leakage of light from the shutter elements even when the device is in an unbiased state. The leakage of light from the shutter elements causes reduction in the contrast of the resultant images and thus critically impairs the performance characteristics of the device.

It is, accordingly, an important object of the present invention to provide an improved electrooptical light shutter device having discrete shutter elements arranged so that the arrays of the shutter elements is capable of producing a fully continuous linear pixel pattern.

It is another important object of the present invention to provide an improved electrooptical light shutter device which features a light shutter array in which the possibility of a crosstalk occurring between adjacent shutter elements due to leakage of light from the array elements is minimized to enable the shutter device to produce an output image with a significantly enhanced degree of contrast which will provide an improved aesthetic quality of the image.

It is still another important object of the present invention to provide an improved electrooptical light shutter device in which leakage of light from edge portions shutter elements blocks is prevented in such a manner that a number of grooves are cut into the substrate with use of a mechanical cutting tool during fabrication of the light shutter array.

Yet, it is still another important object of the present invention to provide an optical printer apparatus using such an improved electrooptical light shutter device according to the present invention.

SUMMARY OF THE INVENTION

In accordance with one outstanding aspect of the present invention, there is provided an electrooptical light shutter device for use in an optical printer apparatus, comprising (a) a number of shutter elements arranged in the form of at least one linear array, each of the shutter elements having an electrooptical effect, (b) a polarizer disposed on a light-incoming side of the array of the shutter elements, and (c) an analyzer disposed on a light-outgoing side of the array of the shutter elements, (d) wherein the shutter elements have respective shutter windows through which light is to be passed selectively and the shutter windows are arranged to be overlapped by one another in a direction substantially perpendicular to the direction in which the shutter elements are arranged.

In accordance with another outstanding aspect of the present invention, there is provided an electrooptical light shutter device for use in an optical printer apparatus, comprising (a) an elongated strip of a material having an electrooptical effect, the strip being formed with grooves which define a number of shutter elements each in the form of a block, (b) a polarizer disposed on a light-incoming side of the array of the shutter elements, and (c) an analyzer disposed on a light-outgoing side of the array of the shutter elements, (d) wherein the grooves defining the shutter elements include a first set of grooves extending longitudinally of the elongated strip and substantially in parallel with one another, and a second set of grooves extending in a skewing relationship to the first set of grooves.

In accordance with still another outstanding aspect of the present invention, there is provided an electrooptical light shutter device for use in an optical printer apparatus, comprising (a) a number of shutter elements arranged in the form of at least one linear array, each of the shutter elements having an electrooptical effect, (b) a polarizer disposed on a light-incoming side of the array of the shutter elements, (c) an analyzer disposed on a light-outgoing side of the array of the shutter elements, and (d) mask means disposed in the vicinity of or on the array of the shutter elements and formed with apertures arranged in at least one array and located respectively in correspondence with the shutter elements, (e) wherein each of the appertures is shaped such that the apertures are overlapped by one another in a direction substantially perpendicular to the direction in which the apertures are arranged.

BRIEF DESCRIPTION OF THE DRAWINGS

The features and advantages of an electrooptical light shutter device according to the present invention will be more clearly appreciated from the following description taken in conjunction with the accompanying drawings in which like reference numerals designate similar or corresponding members, elements and portions and in which:

FIG. 3C is a cross sectional view taken along line III—III in FIG. 3A;

FIG. 4A is a schematic plan view showing an example of the arrangement in which an electrooptical light shutter device including the light shutter array illustrated in FIGS. 3A and 3B is used to form part of an image writing head assembly of an electrooptical printer apparatus;

FIG. 4B is a side elevation view showing, partly in section, the arrangement illustrated in FIG. 4A;

FIG. 5 is a schematic, fragmentary plan view showing the equivalent circuit arrangement of a portion of the light shutter array shown in FIGS. 3A to 3C and forming part of the arrangement illustrated in FIGS. 4A and 4B;

FIG. 10A is a schematic plan view of the dual-row shutter element configuration in which the shutter elements of the light shutter array illustrated in FIG. 8 are arranged in two parallel rows;

FIG. 10B is a schematic plan view of the single-row pixel pattern of the pixels produced when all the in-use shutter elements located in staggering relationship in the dual-row configuration illustrated in FIG. 8 are selected for activation;

FIG. 11 is a schematic plan view of a single-row shutter element configuration in which the shutter elements on one half area of the light shutter array illustrated in FIG. 8 are arranged in a single row to form a modification of the light shutter array shown in FIG. 8;

FIG. 14A is a fragmentary plan view showing a portion of a light shutter array forming part of a fourth preferred embodiment of an electrooptical light shutter device according to the present invention;

FIG. 17 is a fragmentary perspective view showing the combination of a light shutter array and a mask plate which form part of a fifth preferred embodiment of an electrooptical light shutter device according to the present invention;

FIG. 18 is a view similar to FIG. 17 but shows a modification of the combination of the light shutter array and mask plate shown in FIG. 17;

FIG. 19 is a cross sectional view showing an example of the arrangement in which the mask plate is positioned with respect to the light shutter array shown in FIG. 17 or FIG. 18;

DESCRIPTION OF THE PREFERRED EMBODIMENTS

First Preferred Embodiment

Figure 1A:
FIG. 1A is a schematic plan view of an example of the arrangement in which the shutter elements of a prior-art PLZT light shutter array of the single-row type are disposed in a single row.
Figure 1B:
FIG. 1B is a schematic plan view of the single-row pixel pattern of the pixels which may be produced when the shutter elements arranged as illustrated in FIG. 1A are activated.
Figure 2A:
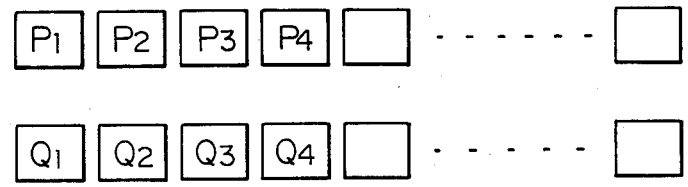
FIG. 2A is a view similar to FIG. 1A but shows an example of the arrangement in which the shutter elements of a PLZT light shutter array of the dual-row type are disposed in two rows.
Figure 2B:
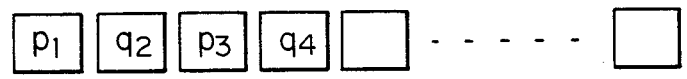
FIG. 2B is a schematic plan view of the single-row pixel pattern of the pixels which may be produced when the shutter elements located in staggering relationship in the dual-row configuration illustrated in FIG. 2A are activated.
Figure 3A:
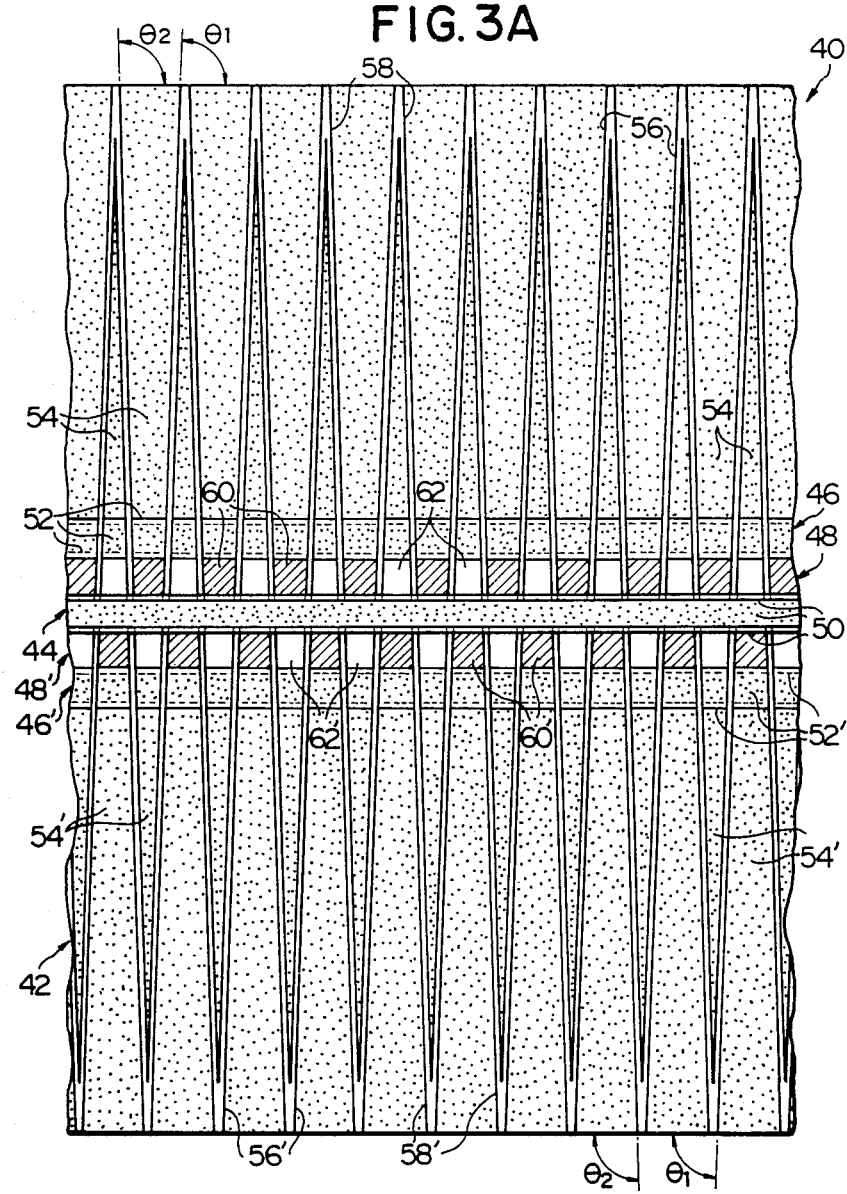
FIG. 3A is a fragmentary plan view showing a light shutter array forming part of a first preferred embodiment of an electrooptical light shutter device according to the present invention.
Figure 3B:
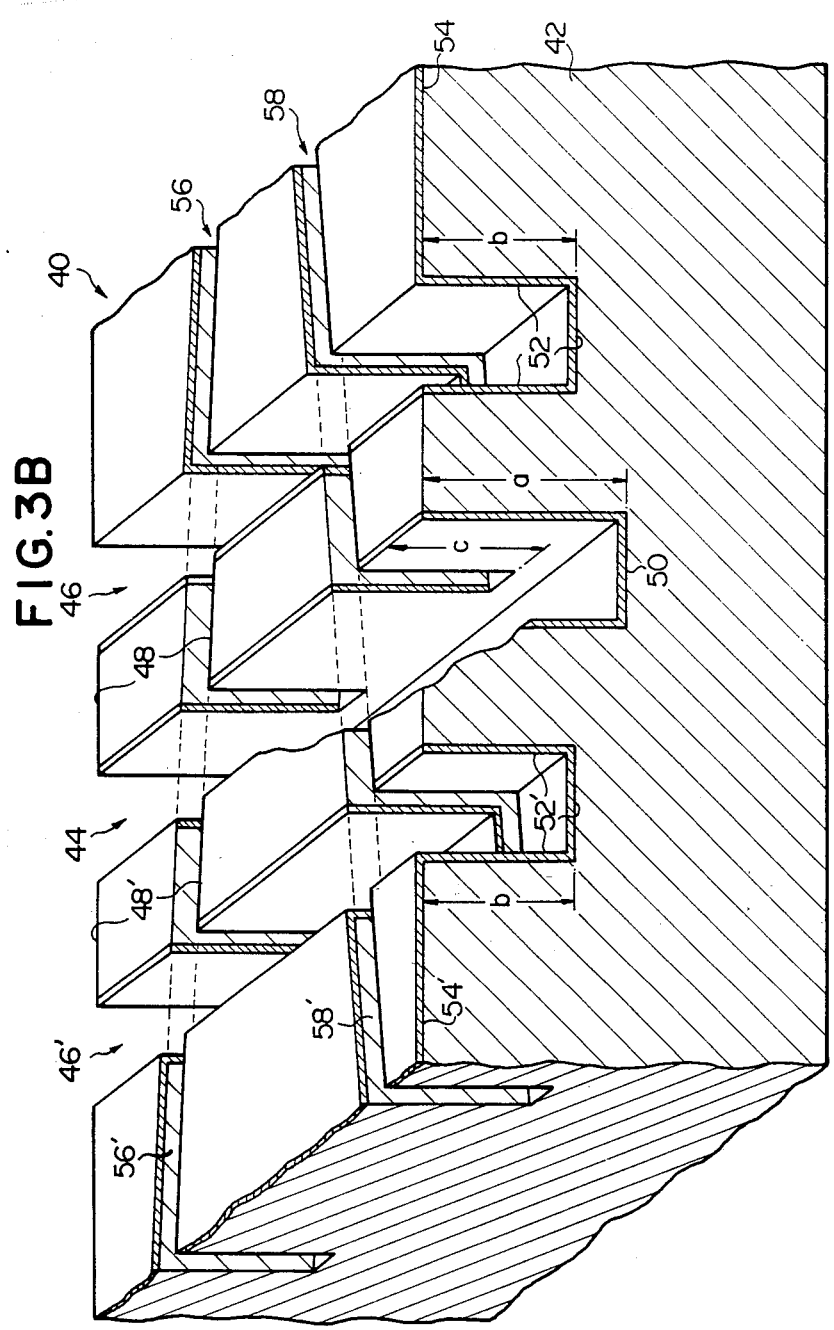
FIG. 3B is a fragmentary perspective view of the light shutter array illustrated in FIG. 3A.

Referring to FIGS. 3A to 3C, a light shutter array included in a first preferred embodiment of an electrooptical light shutter device according to the present invention is provided in the form of a PLZT light shutter array of the dual-row type. The light shutter array, designated by reference numeral 40, comprises a PLZT ceramic substrate 42 formed with a center groove 44 and a pair of side grooves 46 and 46' extending along and on both sides of the center groove 44. Between the center groove 44 and one side groove 46 is provided a row of shutter elements 48 and between the center groove 44 and the other side groove 46' is provided a row of shutter elements 48'. Each of these shutter elements 48 and 48' has a generally trapezoidal top face forming the shutter window of the shutter element as will be described in more detail. The center groove 44 having a depth a is deeper than each of the side grooves 46 and 46' which are assumed to have equal depths b as will be seen from FIGS. 3B and 3C.

The grooved surface of the substrate 42 except for the top faces of the shutter elements 48 and 48' is covered with an electrically conductive film of, for example, aluminum which is typically formed by sputtering techniques. The conductive film provides a common electrode 50, two sets of control electrode segments 52 and 52', and two sets of lead electrode segments 54 and 54'. The common electrode 50 covers the entire areas of the bottom and opposite side walls defining the center groove 44. The control electrode segments 52/52' of each set are spaced apart a predetermined pitch distance from one another along each of the grooves 46 and 46'. Each set of control electrode segments 52/52' covers the bottom wall and side walls defining each of the side grooves 46 and 46'. The lead electrode segments 54 and 54' merge out of these control electrode segments 52 and 52', respectively, and terminate at the parallel edges of the ceramic substrate 42. The edges at which the lead electrode segments 54 and 54' thus terminate will be hereinafter referred to as terminal edges of the substrate 42.

The shutter elements 48/48' and electrode segments 52/52' and 54/54' in each half area of the substrate 42 are separated from one another in directions parallel with the grooves 46 and 46' by two sets of parallel solation grooves. The isolation grooves in each half area of the substrate 42 consist of two sets of isolation grooves 56/56' and 58/58' extending outwardly from each side wall of the center groove 44 to each terminal edge of the substrate 42 across each row of shutter elements 48/48' and through each side groove 46/46'. The isolation grooves 56 and 56' extend at a first predetermined angles $\theta_1$ less than 90 degrees to the side grooves 46 and 46' and the isolation grooves 58 and 58' extend at a second predetermined angle $\theta_2$ larger than 90 degrees to the grooves 46 and 46'.

As will be seen from FIGS. 3B and 3C, the isolation grooves 56, 56', 58 and 58' are formed to a depth c less than the depth a of the center groove 44 and larger than the depth b of the side grooves 46 and 46'. Accordingly, the isolation grooves 56, 56', 58 and 58' have bottom surfaces higher than the bottom surface of the center groove 44 so that the common electrode 50 formed at the bottom of the center groove 44 remains intact although the shutter elements 48/48' on each side of the groove 44 are separated from one another by the isolation grooves 56/56' and 58/58'.

Each of the shutter elements 48 and 48' has an isoscelesly trapezoidal shutter window which has one of its parallel bases defined by one side wall of the center groove 44 and the other base defined by the inner side wall of one of the side grooves 46 and 46'. The trapezoidal shutter window of each shutter element further has one of its legs defined by one of the isolation grooves 56 or 56', and the other of its legs defined by one of the isolation grooves 58 or 58'. The shutter elements 48/48' in each half area of the substrate 42 consist of a set of alternate shutter elements 60/60' each having its legs defined by a pair of adjacent isolation grooves 56/56' and 58/58' spaced wider apart from each other away from the center groove 44, and a set of alternate shutter elements 62/62' each having its legs defined by a pair of adjacent isolation grooves 56/56' and 58/58' which become closer to each other away from the groove 44. For purposes of convenience, each of the former shutter elements 60 and 60' is herein shown hatched and will be referred to as in-use shutter element, while each of the latter shutter elements 62 and 62' is represented by a region which is left blank and will be herein referred to as out-of-use shutter element. As will be apparent from FIG. 3A, such in-use and out-of-use shutter elements appear alternately along the center groove 44 and are inverted alternately from one to another so that every adjacent two of the shutter elements 48/48' arranged in a row have respective adjacent legs parallel with each other.

The isolation grooves 56, 56', 58 and 58' terminate at the parallel terminal edges of the ceramic substrate 42 so that two adjacent ones of the isolation grooves meet each other at one terminal edge of the substrate 42. Thus, the isolation grooves 56/56' and 58/58' in the substrate 42 as a whole form a generally zigzag line which oscillates between the opposite terminal edges of the substrate 42 and which is discrete across the center groove 44. At each of the terminal edges of the substrate 42, the isolation grooves thus oscillating in a zigzag pattern form vertices each at an angle of $\theta_2-\theta_1$. Accordingly, the lead electrode segments 54 and 54' also consist of those having isoscelesly trapezoidal areas and those having isoscelesly triangular areas. The lead electrode segments having the trapezoidal areas are herein referred to as in-use lead electrode segments and those having the triangular areas referred to as out-of-use lead electrode segments. Such in-use and out-of-use lead electrode segments also appear alternately in a direction parallel with the grooves 44, 46 and 46'.

The light shutter array 40 thus constructed in accordance with the present invention may be used in an electrooptical printer apparatus. FIGS. 4A and 4B show an example of the arrangement in which the light shutter array 40 is used as an image writing head assembly in such an apparatus. In the arrangement herein shown, the light shutter array 40 is provided between a polarizer 64 held in contact with the reverse face of the substrate 42 of the light shutter array 40 and an analyzer 66 held in contact with the grooved surface of the light shutter array 40. The light shutter array 40, polarizer 64 and analyzer 66 thus arranged form, in combination, an electrooptical light shutter device embodying the present invention. The polarizer 64 and analyzer 66 may be positioned with respect to each other so that the optical absorption axis of one of them is either in parallel relationship or in intersecting relationship to that of the other. On the polarizer 64 is to be incident a beam of light originating from a suitable light source 68. The light emitted from the source 68 is passed through a slot 70 and a cylindrical condensing lens 72 to the polarizer 64, and is transmitted through the unit of the polarizer 64, light shutter array 40 and analyzer 66 and past a condensing cylindrical lens array 74 to the peripheral surface of a photo-sensitive drum 76.

The individual shutter elements 48 and 48' of the light shutter array 40 are arranged so that the in-use shutter elements 60 and 60' are located in staggering relationship between the two rows as schematically illustrated in FIG. 5 in which the in-use shutter elements 60 and 60' are shown criss-cross hatched and the out-of-use shutter elements 62 and 62' are shown simply hatched. One set of in-use shutter elements 60 is connected through terminals 78 to a driver circuit 80 and the other set of in-use shutter elements 60' is connected through terminals 78' to a driver circuit 80'. These driver circuits 80 and 80' are operative to produce driver signals at controlled different timings so that the shutter elements 60' are to be activated at a certain controlled timing after the shutter elements 60 are activated, or vice versa. It will be apparent that the connection between each of the in-use shutter elements 60 and each of the associated terminals 78 is provided by each of the lead electrode segments 54 of the light shutter array 48 and the connection between each of the in-use shutter elements 60' and each of the associated terminals 78' is provided by each of the lead electrode segments 54' of the light shutter array 48' shown in FIG. 3A. The out-of-use shutter elements 62 and 62' are respectively connected to the lead electrode segments 54 and 54' having the triangular areas and are thus isolated from the terminals 78 and 78', respectively. These out-of-use shutter elements 62 and 62' are simply connected to ground together with the in-use shutter elements 60 and 60' through the common electrode 50 of the light shutter array 40, as also shown in FIG. 5.

Figure 6A:
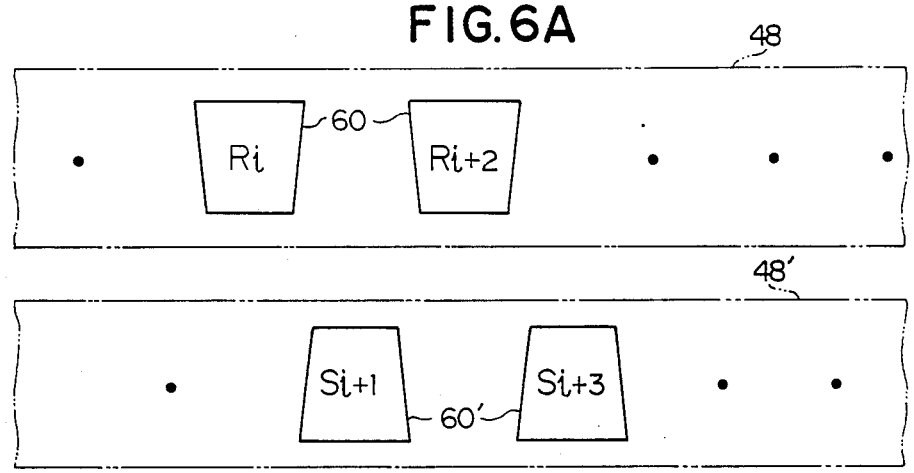
FIG. 6A is a schematic plan view of the dual-row shutter element configuration in which the shutter elements of the light shutter array illustrated in FIGS. 3A to 3C are arranged in two parallel rows.
Figure 6B:
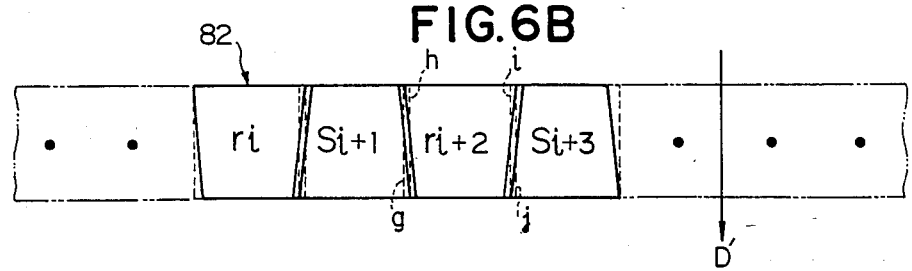
FIG. 6B is a schematic plan view of the single-row pixel pattern of the pixels produced when all the in-use shutter elements located in staggering relationship in the dual-row configuration illustrated in FIG. 6C are selected for activation.

In FIG. 6A, the in-use shutter elements 60 of one row are indicated at $R_i$, $R_{i+2}$, respectively, and the in-use shutter elements 60' of the other row are indicated at $S_{i+1}$, $S_{i+3}$, ..., respectively. In this dual-row arrangement, the shutter elements 60 selected out of the set of in-use shutter elements $R_i$, $R_{i+2}$, ... of the first row are activated at a controlled timing by means of the driver circuit 80 and the shutter elements 60' selected out of the set of alternate shutter elements $S_{i+1}$, $S_{i+3}$, ... of the second row are activated at a predetermined time interval by means of the driver circuit 80' after the shutter elements of the first row have been activated. The photo-sensitive drum 76 (FIGS. 4A and 4B) is driven for rotation in the direction of arrow D at a constant speed so that the beams of light passed through the selected shutter elements of the first row and the beams of light passed through the selected shutter elements of the second row are incident on a single line extending longitudinally on the peripheral surface of the drum 76. A single-row pixel pattern 82 composed of pixel regions ..., $r_i$, $s_{i+1}$, $r_{i+2}$, $s_{i+3}$, ... will thus be produced on the drum 76 as shown in FIG. 6B if all of the in-use shutter elements $R_i$, $R_{i+2}$, ... and $S_{i+1}$, $S_{i+3}$, ... are selected. Indicated by arrow D' in FIG. 6B is the direction in which the peripheral surface of the drum 76 is assumed to travel when the drum 76 is driven for rotation as shown in FIG. 4B.

The beams of light passed through the in-use shutter elements 60 and 60' would be incident on the peripheral surface of the drum 76 as indicated by spots in full lines in FIG. 6B if the drum 76 were driven to turn instantaneously from an angular position responsive to the beams through the shutter elements 60 of the first row to an angular position responsive to the beams through the shutter elements 60' of the second row. Actually, however, the peripheral surface of the rotating drum 76 turns at a certain velocity between such angular positions in the direction of arrow D' shown in FIG. 6B so that the surface of the drum is irradiated to form generally rectangular light spots overlapped by one another along the row of the pixel regions. Accordingly, every adjacent two pixel regions in the pixel pattern have their adjacent side marginal areas overlapped by each other in a direction in which the row of the pixel regions ..., $r_i$, $s_{i+1}$, $r_{i+2}$, $s_{i+3}$, ... extends. The adjacent pixel regions ..., $r_i$, $s_{i+1}$, $r_{i+2}$, $s_{i+3}$, thus overlapped recurrently by one another form a truly continuous line of pixels provided all the shutter elements 60 and 60' of the rows shown in FIG. 6A are activated. Where the width of each shutter element along the center line between the bases of the shutter element is selected at 80 microns, a continuous line with a density of about 12 pixels per millimeter can thus be formed on the peripheral surface of the drum 76.

Figure 7:
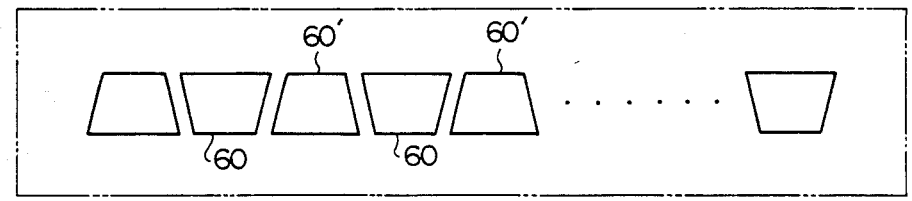
FIG. 7 is a schematic plan view of a single-row shutter element configuration in which the shutter elements on one half area of the PLZT light shutter array illustrated in FIGS. 3A and 3B are arranged in a single row to form a modification of the light shutter array shown in FIGS. 3A to 3C.

The light shutter array 40 which has been described with reference to FIGS. 3A to 3C may be modified in numerous manners. For example, only one half area of the light shutter array 40 may be used to form a complete light shutter array. Such a modified light shutter array may comprise a single row of alternately inverted trapezoidal shutter elements which may be provided by the shutter elements 48 as shown in FIG. 7. The modified light shutter array further comprises a single row of control electrode segments formed in a single side groove, in addition to the common electrode in the center groove and the lead electrode segments leading respectively from the control electrode segments. The shutter elements arranged in a single row have isoscelesly trapezoidal shutter windows which are inverted alternately along the row of the shutter elements so that every adjacent two of the trapezoidal shutter elements have respective adjacent legs which are parallel with each other. The shutter elements of the singlerow light shutter array are further arranged so that the trapezoidal shutter windows of every adjacent two shutter elements have their major parallel bases overlapped in a direction perpendicular to the row of shutter elements, viz., the direction of rotation D of the photo-sensitive drum (FIGS. 4A and 4B). In this single-row light shutter array, the trapezoidal shutter elements are all used as inuse shutter elements with all of the lead electrode segments connected to sources of drive voltage so that a single line of pixels is to be produced by the single row of shutter elements.

Second Preferred Embodiment

Figure 8:
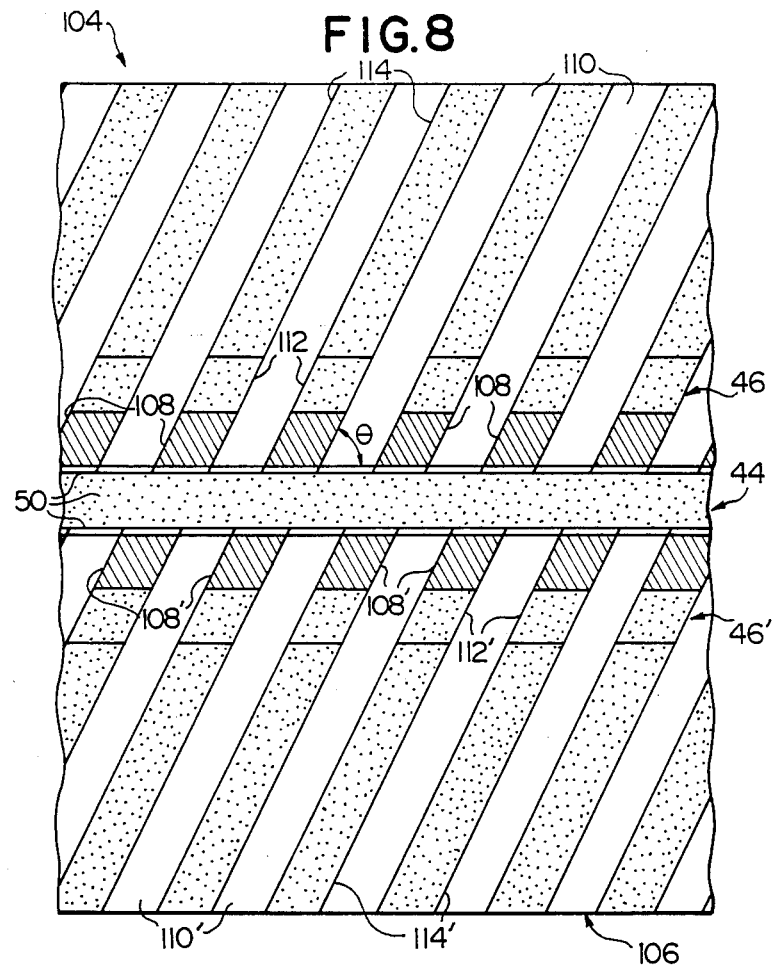
FIG. 8 is a fragmentary plan view showing a portion of a light shutter array forming part of a second preferred embodiment of an electrooptical light shutter device according to the present invention.

Referring to FIG. 8, a light shutter array included in a second preferred embodiment of an electrooptical light shutter device according to the present invention is provided also in the form of a PLZT light shutter array of the dual-row type. The dual-row light shutter array, now designated by reference numeral 104, comprises a PLZT ceramic substrate 106 formed with a center groove 44 and a pair of side grooves 46 and 46' which are arranged similarly to their respective counterparts in the light shutter array described with reference to FIGS. 3A to 3C. On the bottom and opposite side walls defining the center groove 44 is formed a common electrode 50. Between the center groove 44 and side grooves 46 and 46' are formed two rows of shutter elements 108 and 108' which are in this embodiment arranged to have parallelogrammic shutter windows. The shutter elements 108 on one side of the center groove 44 are separated from one another by a set of parallel isolation grooves 110 and the shutter elements 108' on the other side of the center groove 44 are separated from one another by a set of parallel isolation grooves 110'. All these isolation grooves 110 and 110' extend outwardly from the center groove 44 each at a predetermined angle $\theta$ less than 90 degrees to the groove 44. Thus, there are formed two sets of discrete control electrode segments 112 and 112' which extend in line with the shutter elements 108 and 108', respectively, from the outer side walls of the side grooves 46 and 46′ and two sets of discrete lead electrode segments 114 and 114′ merge respectively out of the control electrode segments 112 and 112′. All the isolation grooves 110 and 110′ thus extending from the center groove 44 terminate at the parallel terminal edges of the ceramic substrate 106. As in the light shutter array 40 shown in FIGS. 3A to 3B, the isolation grooves 110 and 110′ of the light shutter array 104 are formed to a depth (c) less than the depth (a) of the center groove 44 and larger than the depth (b) of the side grooves 46 and 46′.

Figure 9:
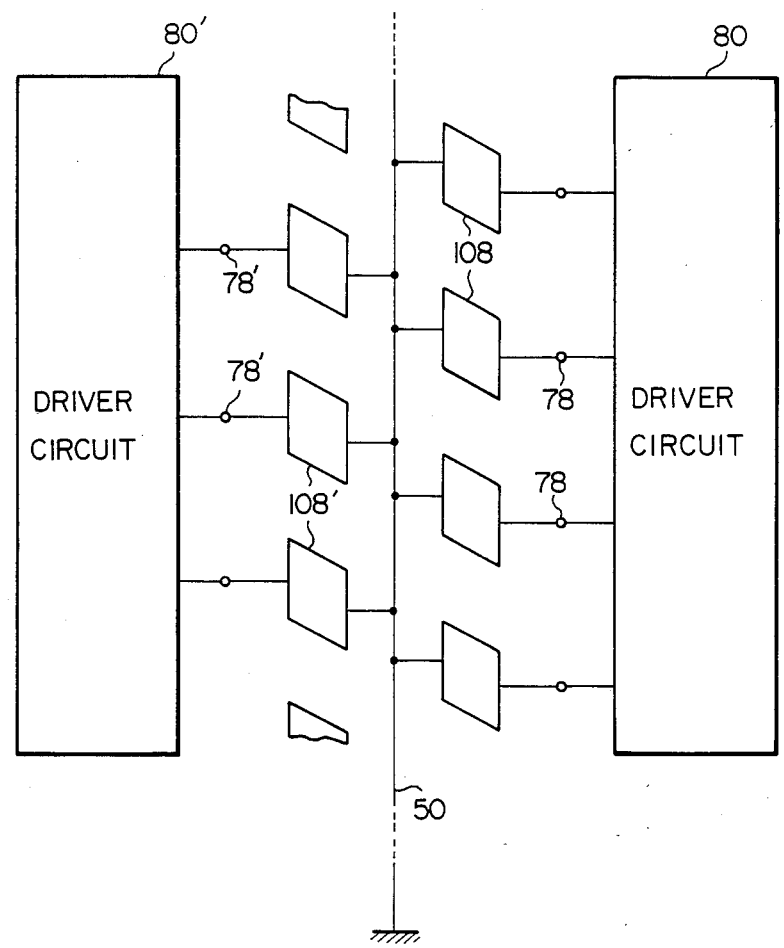
FIG. 9 is a schematic, fragmentary plan view showing the equivalent circuit arrangement of the light shutter array shown partly illustrated in FIG. 8.

The parallelogrammic shutter window of each of the shutter elements 108 and 108′ has one of its parallel bases defined by one side wall of the center groove 44 and the other of the parallel bases defined by the inner side wall of one of the side grooves 46 and 46′, and its parallel legs defined by adjacent two of the isolation grooves 110 or 110′. Such shutter elements 108 and 108′ are located in staggering relationship between the two rows as schematically illustrated in FIG. 9. As in the circuit arrangement shown in FIG. 5, one set of shutter elements 108 is connected through terminals 78 to a driver circuit 80 and, similarly, the other set of shutter elements 108′ is connected through terminals 78′ to a driver circuit 80. The light shutter array 104 having the shutter elements 108 and 108′ thus arranged may also be used to form part of an image writing head assembly similar to that shown in FIGS. 4A and 4B.

In FIG. 10A, the shutter elements 108 disposed in one row are indicated at $T_i$, $T_{i+1}$, $T_{i+2}$, ..., respectively, and the shutter elements 108′ disposed in another row are indicated at $U_i$, $U_{i+1}$, $U_{i+2}$, ..., respectively. In this dual-row arrangement, the shutter elements 108 selected out of the set of shutter elements $T_i$, $T_{i+1}$, $T_{i+2}$, ... of the first row are first activated at a controlled timing by means of the driver circuit 80 and the shutter elements 108′ selected out of the set of shutter elements $U_i$, $U_{i+1}$, $U_{i+2}$, ... of the second row are activated at a predetermined time interval by means of the driver circuit 80′ after the shutter elements of the first row have been activated. The two rows of such shutter elements 108 and 108′ being activated with a predetermined time lag therebetween, a single-row pixel pattern 104′ composed of pixel regions ..., $t_i$, $u_i$, $t_{i+1}$, $u_{i+1}$, will thus be produced on the photo-sensitive drum of the image writing head assembly as shown in FIG. 10B if all of the shutter elements $T_i$, $T_{i+1}$, $T_{i+2}$, ... and $U_i$, $U_{i+1}$, $U_{i+2}$, ... are selected.

The light shutter array 104 hereinbefore described may also be modified in numerous manners. Thus, only one half area of the light shutter array 104 may be used to form a complete light shutter array comprising a single row of shutter elements each with a parallelogrammic shutter window as shown in FIG. 11 in addition to a single set of control electrode segments and a single set of lead electrode segments. Every adjacent two of the shutter elements thus arranged in a single row have respective adjacent legs parallel with each other and every shutter element has one of its parallel bases overlapped by one of the adjacent two (preceeding and succeeding) shutter elements and the other of the parallel bases overlapped by the other of the adjacent two shutter elements in a direction perpendicular to the row of shutter elements.

Third Preferred Embodiment

Figure 12A:
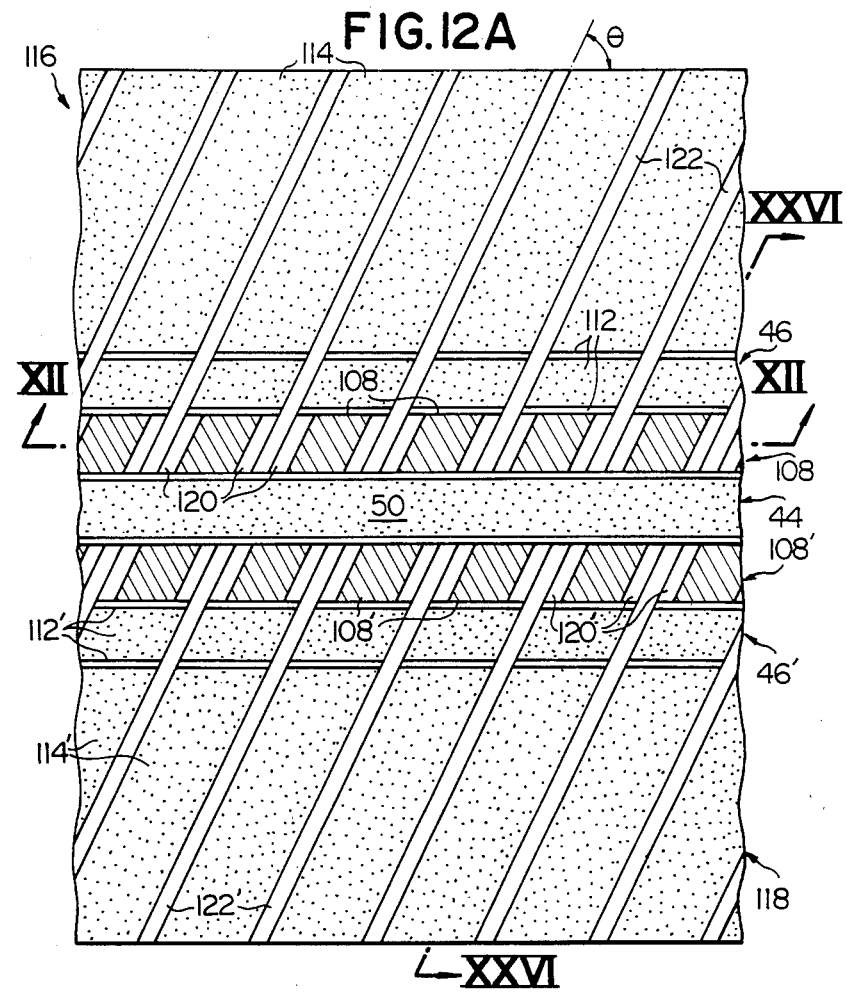
FIG. 12A is a fragmentary plan view showing a portion of a light shutter array forming part of a third preferred embodiment of an electrooptical light shutter device according to the present invention.
Figure 12B:
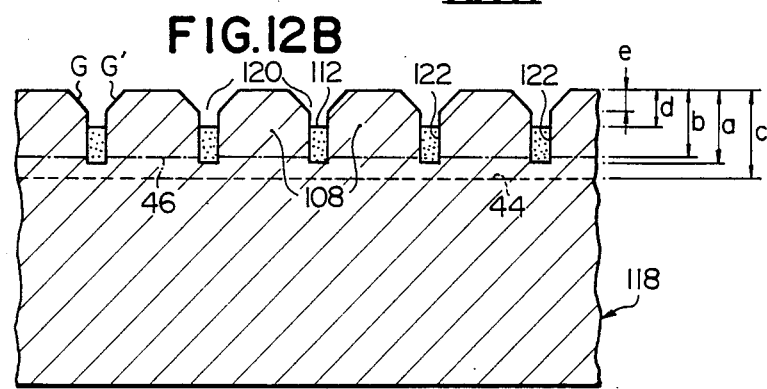
FIG. 12B is a sectional view taken along line XII—XII in FIG. 14A.

Referring to FIGS. 12A and 12B, a light shutter array included in a third preferred embodiment of an electro-optical light shutter device according to the present invention is largely similar to the light shutter array 104 hereinbefore described with reference to FIG. 8.

In this light shutter array, which is now designated by reference numeral 116, a PLZT ceramic substrate 118 is also formed with a center groove 44, side grooves 46 and 46′ and rows of shutter elements 108 and 108′ provided between the center groove 44 and side grooves 46 and 46′, respectively. Between the rows of the shutter elements 108 and 108′ is provided a common electrode 50 and outside the rows of the shutter elements 108 and 108′ are respectively provided two sets of control electrode segments 112 and 112′ and two sets of lead electrode segments 114 and 114′ as in the light shutter array described with reference to FIG. 8. The lead electrode segments 114 and 114′ have roughened surfaces which are formed to a depth e from a plane level with the top faces of the shutter elements 108 and 108′. The light shutter array shown in FIGS. 12A and 12B is, however, advantageous over the light shutter array 104 in that electrode segments are formed on the substrate in such a manner as to be retained more firmly and reliably to the surface of the substrate. The electrode segments of such a light shutter array will not be stripped from the substrate while, particularly, isolation grooves are being cut into the substrate with use of a mechanical cutting tool such as a dicing saw during fabrication of the light shutter array.

The ceramic substrate 118 in the light shutter array 116 herein shown further has a set o groove portions 120 formed in one shutter element 108 and a set of groove portions 120′ formed in the other shutter element 108′. The groove portions 120 separate the shutter elements 108 of one row from one another and, similarly, the groove portions 120′ separate the shutter elements 108′ from one another. These groove portions 120 and 120′ have equal widths along the rows of the shutter elements 108 and 108′ so that the individual discrete shutter elements 108/108′ of each row are spaced apart a predetermined pitch distance from one another longitudinally of the row of the shutter elements 108/108′. In addition, each of the shutter elements 108 and 108′ has a parallelogrammic shutter window having one of its parallel bases defined by one of the side walls of the center groove 44 and the other of the parallel bases defined by the inner side wall of one of the side grooves 46 and 46′. The parallel legs of such a parallelogrammic shutter window is inclined at a predetermined angle $\theta$ less than 90 degrees to the direction in which the shutter elements 108/108′ are arranged in a row. The groove portions 120 and 120′ thus defining the shutter elements 108 and 108′ have a depth d less than both the depth a of the center groove 44 and the depth b of the side grooves 46 and 46′. The depth of the roughened surfaces of the lead electrode segments 114 and 114′ is larger than this depth d of the groove portions 120 and 120′ and less than the depth b of the side grooves 46 and 46′.

The substrate 118 is further formed with two sets of isolation grooves 122 and 122′ respectively provided within the half areas of the substrate 118 outside the center groove 44. The isolation grooves 122 extend through the side groove 46 and the groove portions 120, respectively, between the shutter elements 108 each at the angle $\theta$ to the side groove 46. The isolation grooves 122′ likewise extend through the side groove 46′ and the groove portions 120′, respectively, between the shutter elements 108′ each at the angle $\theta$ to the side groove 46′.

These isolation grooves 122 and 122' are formed to a depth c less than the depth a of the center groove 44 and larger than the depth b of the side grooves 46 and 46' and the depth d of the groove portions 120 and 120'. The isolation grooves 122 separate the control electrode segments 112 and the lead electrode segments 114 from one another and further separate the shutter elements 108 from one another. Similarly, the isolation grooves 122' separate the control electrode segments 112' and the lead electrode segments 114' from one another and further separate the shutter elements 108' from one another. As will be seen from FIG. 12B, furthermore, each of the groove portions 120/120' are depthwise reduced in width so that the shutter element 108/108' formed between adjacent two of the groove portions has a pair of bevelled side edge portions terminating upwardly at the top face of the shutter element and downwardly into the isolation grooves 122/122', respectively, between which the shutter element is located.

Figure 14B:
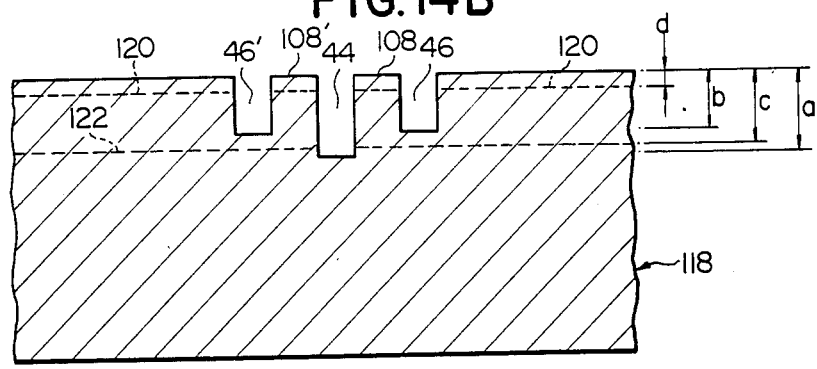
FIG. 14B is a sectional view taken along line B—B in FIG. 4A.
Figure 14C:
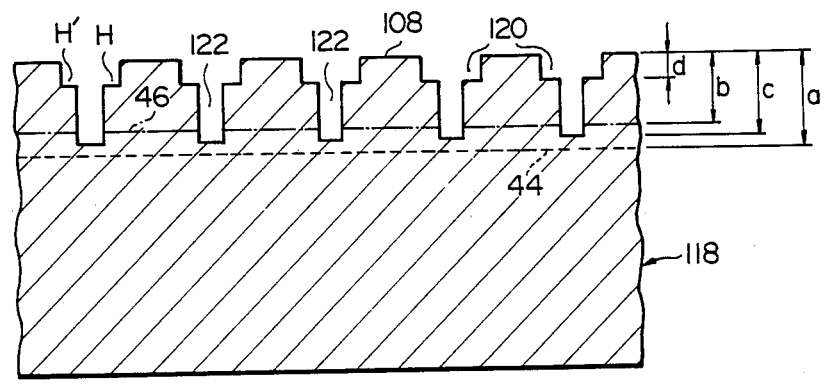
FIG. 14C is a sectional view taken along line C—C in FIG. 4A.
Figure 15A:
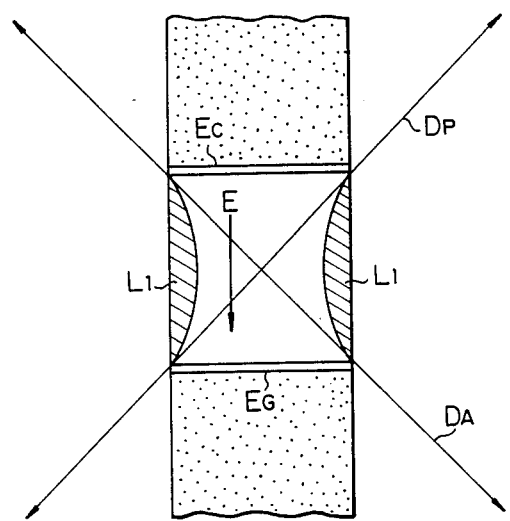
FIG. 15A is a schematic plan view showing to an enlarged scale a shutter element having a square-shaped cross section as in a prior-art light shutter array.
Figure 15B:
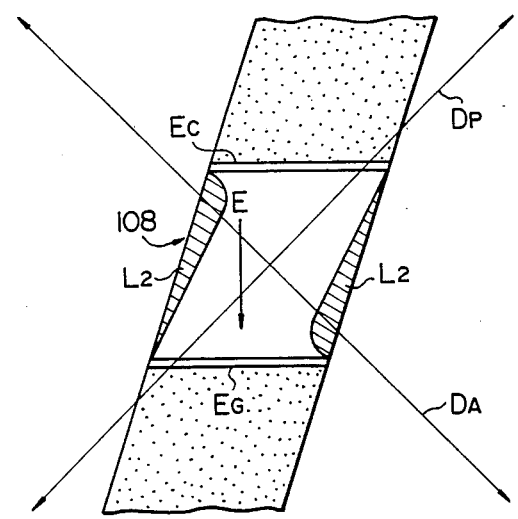
FIG. 15B is a view similar to FIG. 15A but shows a shutter element having a parallelogrammic cross section as in the light shutter array illustrated in FIGS. 14A to 14C.

FIG. 15A shows a shutter element having a square-shaped cross section as in a light shutter array and FIG. 15B shows a shutter element having a parallelogrammic cross section as in the light shutter array hereinbefore described with reference to FIGS. 14A to 14C. In each of FIGS. 15A and 15B, it is assumed that light outgoing from the shutter element travels in a direction normal to the sheet of drawing. Lines $D_P$ and $D_A$ in FIGS. 15A and 15B indicate the directions of oscillation (transmission axis directions) of light through the polarizer 64 and analyzer 66, respectively, in the image writing head assembly shown in FIGS. 4A and 4B. Indicated by arrow E is the direction in which an electric field is to be built up through the shutter element between the control and common electrodes $E_C$ and $E_G$ during use of the electrooptical light shutter device.

Observation of these shutter elements by a transmission polarizing microscope has revealed that a leakage of light from a shutter element takes place through each of the areas $L_1$ and $L_2$ shown hatched in FIGS. 15A and 15B, respectively, even when the shutter element remains de-activated. Experiments have shown that the thickness of such an area $L_1/L_2$ from the side edge of the array element as defined by the isolation groove is generally of the order of 20 microns although such a parameter varies appreciably with the process parameters with which the light shutter array is fabricated. The experiments have further indicated that the leakage of light from a shutter element depends prominently on the depth to which the isolation grooves defining the shutter element and can be eliminated when the isolation grooves are cut to a depth (c) less than about 50 microns to 60 microns from the top faces of the elements.

Figure 13A:
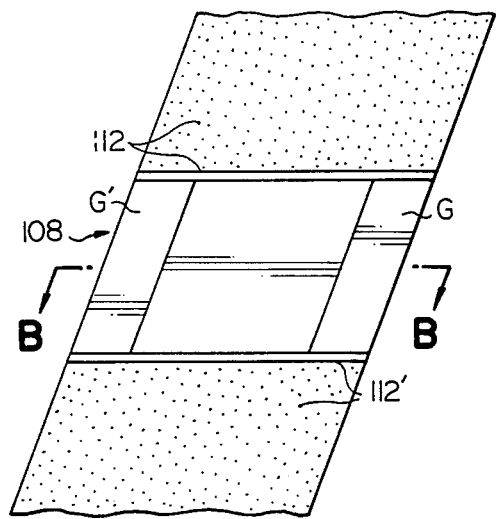
FIG. 13A is a fragmentary plan view showing, to an enlarged scale, one of the shutter elements provided in the light shutter array illustrated in FIGS. 12A and 12B.
Figure 13B:
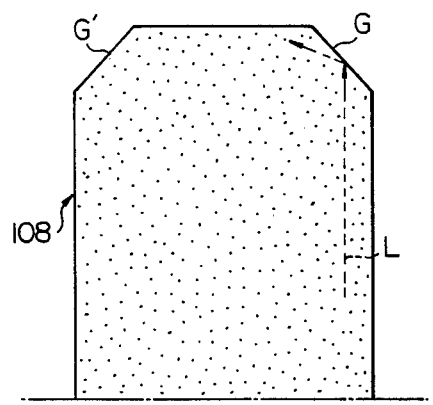
FIG. 13B is a sectional view taken along line B—B in FIG. 3A.

FIGS. 13A and 13B show one of the shutter elements 108 and 108' provided in the light shutter array 116. The shutter element, herein represented by the shutter element 108 formed between adjacent two of the groove portions 120, has a pair of bevelled side edge portions G and G' terminating upwardly at the top face of the shutter element 108 and downwardly in the isolation grooves 122. A beam of light L which may be admitted into the shutter element 108 through the bottom face of the light shutter array will advance upwardly along the vertical side faces of the shutter element 108 until the beam reaches the side edge portions G and G' as indicated by a broken line in FIG. 13B. The beam of light L will be then reflected at each side edge portion and will be re-directed inwardly of the shutter element 108. The incoming beam of light L is thus precluded from being allowed out of the shutter element 108 into another shutter element. For this reason, the provision of the groove portions 120 and 120' is useful for avoiding an occurrence of leakage of light from the edge portions of the shutter elements.

Fourth Preferred Embodiment

FIGS. 14A to 14C show a light shutter array which forms part of a fourth preferred embodiment of an electrooptical light shutter device according to the present invention. The light shutter array herein shown is largely similar to the light shutter array hereinbefore described with reference to FIGS. 12A and 12B and is advantageous particularly for preventing leakage of light from the edge portions of shutter elements of the light shutter array similar to the described third preferred embodiment of the present invention.

In contrast to the light shutter array described with reference to FIGS. 12A and 12B in which he groove portions 120 and 120' are formed only in the rows of the shutter elements 108 and 108', such groove portions, also designated by 120 and 120', extend not only through the rows of the shutter elements 108 and 108', respectively, but in the areas of the substrate 118 outside the side grooves 46 and 46', respectively, each at a predetermined angle $\theta$ to the grooves 46 and 46'. Furthermore, the groove portions 120 and 120' defining the shutter elements 108 and 108' have flat bottoms each with a depth d far less than both the depths a of the center groove 44 and the depth b of the side grooves 46 and 46' as will be seen from FIGS. 14B and 14C. The isolation grooves 122 and 122' extend through these groove portions 120 and 120', respectively, and further through the bottom walls of the side grooves 46 and 46'. Such isolation grooves 122 and 122' are formed to a depth c less than the depth a of the center groove 44 and larger than the depth b of the side grooves 46 and 46' and the depth d of the groove portions 120 and 120'.

As will be best seen from FIG. 14C, each of the shutter elements 108 and 108' has a pair of recessed or inwardly offset side edge portions H and H' each having a flat bottom face portion and a side face portion upwardly terminating at the top face of the shutter element. Thus, the individual shutter elements 108/108' of each row are spaced apart from one another through the isolation grooves 122/122' which may typically be 130 microns deep and 25 microns wide and further have respective top portions spaced apart from one another through the groove portions 120/120' which may typically be 40 microns deep and 25.5 microns wide. As a result of such a configuration of each shutter element, the leakage of light from each shutter element depends largely on the depth of the groove portions 120/120', viz., the height of the edge portions H and H' of the shutter elements. When the height of the edge portions H and H' is less than about 50 microns to 60 microns, leakage of light will be precluded satisfactorily. The inwardly offset edge portions H and H' are thus also useful for avoiding an occurrence of leakage of light from shutter elements and accordingly producing an output image with a significantly enhanced degree of contrast.

Figure 16:
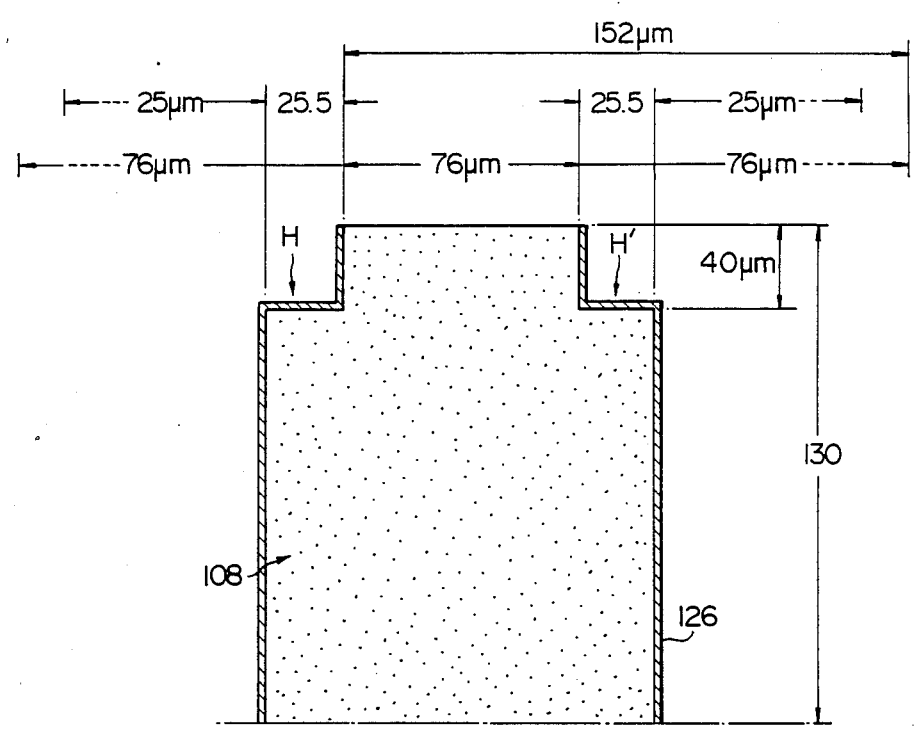
FIG. 16 is a schematic sectional view showing also to an enlarged scale the various dimensions and dimensional relationships of each of the shutter elements provided in the light shutter array illustrated in FIGS. 14A to 14C.

The shutter elements 108/108' are separate from one another through the relatively deep isolation grooves 122/122' which are typically 76 microns wide and further through the relatively shallow groove portions 120/120' which are typically 25 microns wide, as shown in FIG. 16. The relatively deep isolation grooves 122/122' are thus useful not only for separating the shutter elements 108/108' from one another but to have the effective area of each of the shutter elements 108 and 108' isolated, in effect, from the mechanical stresses which may be produced by the cutting of the isolation grooves 122 and 122' into the substrate 118. On the other hand, the relatively shallow groove portions 120/120' are cut preferably to a depth d less than about 50 microns to 60 microns from the top faces of the shutter elements 108/108' in order to eliminate the leakage of light from the shutter element. With the groove portions 120 and 120' each having the width of 76 microns and the isolation grooves 122 and 122' each having the width of 25 microns, the flat bottom face portion of each of the inwardly offset side edge portions H and H' of each shutter element has a width or amount of offset of about 25.5 microns ($=(52-25)/2$) which is less than the thickness of 20 microns of each of the areas $L_1$ and $L_2$ shown in FIGS. 15A and 15B, respectively. The offset side edge portions H and H' of each of the shutter elements 108 and 108' are thus useful for preventing leakage of light from the shutter element, as previously noted.

The provision of the offset side edge portions H and H' results in the overall width ($=80$ microns) of each shutter element larger than the required effective width ($=29$ microns) by a value doubling the amount of offset ($=25.5$ microns), as will apparent from FIG. 16. It has however been ascertained that this will not invite any serious problems because there is little light allowed out of such offset side edge portions H and H' when the shutter element is activated. If desired, however, the side faces of each shutter element defined by the isolation groove 122/122' and the bottom and side face portions of each of the offset side edge portions H and H' may be covered with a coating of a darkly colored or opaque material such as black ink as indicated at 124 in FIG. 16.

Fifth Preferred Embodiment and its Modification

FIG. 17 shows a light shutter array which forms part of a fifth preferred embodiment of an electrooptical light shutter device according to the present invention. The light shutter array, now designated by reference numeral 126, is used in combination with a mask plate 128 and is adapted for more reliably preventing unnecessary emission of light from the array elements due to a crosstalk occurring between adjacent shutter elements.

The light shutter array 126 comprises a substrate 130 formed with a center groove 44 and a pair of side grooves 46 and 46'. The bottom and side walls of the center groove 44 are totally covered with a common electrode 50. Two sets of parallel isolation grooves 132 and 132' extend outwardly from the opposite side walls, respectively, of the center groove 44. The relationships among the grooves 44, 46 and 48 and these isolation grooves 132 and 132' are similar to those in each of the embodiments hereinbefore described. The ceramic substrate 130 is sectionedd to form tw rows of shutter elements 134 and 134' provided between the center groove 44 and side grooves 46 and 46', respectively, two sets of control electrode segments 136 and 136' covering the bottom and side walls of the side grooves 46 and 46', respectively, and two sets of lead electrode segments 138 and 138' covering the areas of the substrate 130 outside the side grooves 46 and 46', respectively. The isolation grooves 132/132' of each set are disposed at a predetermined pitch distance from one another and extend from each side wall of the center groove 44 each at right angles to the groove 44. Each of the shutter elements 134 and 134' is elongated in the direction in which each row of shutter elements extends and has an area at least doubling a predetermined unit area of a square-shaped elementary pixel. Thus, each of the shutter elements 134 and 134' has a half area corresponding to the unit area of an elementary pixel as indicated by dotted lines along the rows of shutter elements 134 and 134'.

On the other hand, the mask plate 128 comprises a transparent substrate 140 having a mask coating 142 of an opaque or otherwise light-shielding material applied to one surface thereof. The mask coating 142 has two rows of square-shaped, transparent windows 144 and 144' each of which has an area conforming to the predetermined unit area of the above mentioned square-shaped elementary pixel and accordingly to one half of the total area of each of the shutter elements 134 and 134'. Such a mask coating 142 may be formed by the sputtering or deposition of the opaque or otherwise light-shielding material with the windows 144 and 144' formed by photolithographically etching the coating 142. The windows 144 and 144' are arranged in staggering relationship between the rows and are thus located in registry with the respective half areas of the individual shutter elements 134 and 134' of the light shutter array 128.

In an image writing head assembly similar to that shown in FIGS. 4A and 4B, the combination of the light shutter array 126 and mask plate 128 thus arranged is to be positioned with the mask plate 128 located between the light shutter array 126 and an analyzer, though not shown in the drawings. The light shutter array 126 of the nature hereinbefore described is advantageous over each of the first to fourth preferred embodiments of the present invention in that only one half of the isolation grooves provided in each of the preceding embodiments may be formed in the light shutter array 126. In consideration of the fact that it is required to form a total of 1000 to 2000 isolation grooves in the light shutter array of each of the first to fourth preferred embodiments of the present invention, such reduction in the number of the isolation grooves in the light shutter array 126 will significantly contribute to simplification of the process of fabricating a light shutter array. It may also be noted that each of the lead electrode segments in the light shutter array 126 has a width corresponding to the sum of the widths of two elementary pixels and will thus provide ease of applying bonding wires to the segments.

The light shutter array 126 hereinbefore described with reference to FIG. 17 may be modified so that the individual shutter elements 134 and 134' thereof are arranged similarly to their counterparts in the light shutter array 40 shown in FIGS. 3A to 3C, the light shutter array 104 shown in FIG. 8, the light shutter array 116 shown in FIGS. 12A and 12B, or the light shutter array shown in FIGS. 14A to 14C. FIG. 18 shows the arrangement in which a light shutter array similar in basic configuration to the light shutter array 126 shown in FIG. 17 and modified to be largely similar to the light shutter array 104 shown in FIG. 8. In the light shutter array of the arrangement shown in FIG. 18, all the isolation grooves 132 and 132' extend at an angle less than 90 degrees to the center groove 44 so that each of the shutter elements 134 and 134' has a generally parallelogrammic cross section. Thus, each of the windows 144 and 144' provided in the mask plate 128 arranged in staggering relationship between two rows in registry with the rows of the shutter elements 134 and 134' is shaped to be parallelogrammic in plan conformingly to one half area of each of such shutter elements of the light shutter array. Indicated at 64 is a polarizer positioned on a lightincoming side of such a light shutter array.

The mask plate 128 in the arrangement shown in FIG. 17 or FIG. 18 may be positioned in close contact with the grooved surface of the light shutter array 126 as shown in FIG. 19. Where the mask plate 128 is used in contact with the light shutter array 126, the mask coating 142 may be covered with a coating of a transparent, electrically insulating material as indicated at 146 in FIG. 19. The combination of the light shutter array and mask plate as hereinbefore described with reference to FIG. 17 or FIG. 18 is positioned closely between a polarizer 64 and an analyzer 66 in an image writing head assembly of the type illustrated in FIGS. 4A and 4B.

Sixth Preferred Embodiment and its Modifications

Figure 20A:
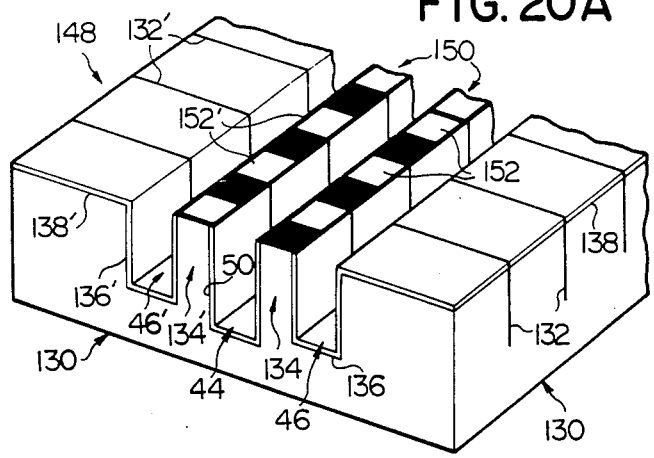
FIG. 20A is a fragmentary perspective view showing a light shutter array which forms part of a sixth preferred embodiment of an electrooptical light shutter device according to the present invention.
Figure 20B:
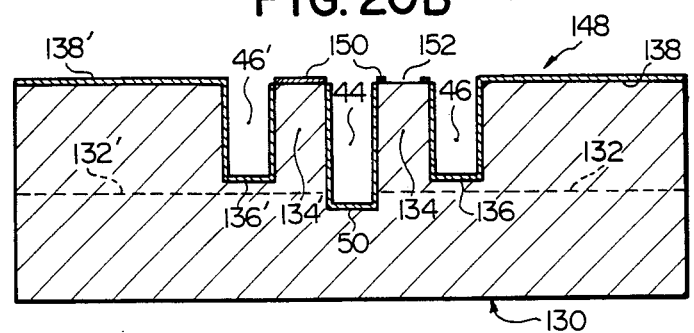
FIG. 20B is a cross sectional view taken along line XX—XX in FIG. 20A.

FIGS. 20A and 20B show a light shutter array which forms part of a sixth preferred embodiment of an electrooptical light shutter device according to the present invention. The light shutter array, now designated by reference numeral 148, is a modification of the light shutter array 126 hereinbefore described with reference to FIG. 17 and is similar in basic configuration to the light shutter array 126. The relationships among the grooves 44, 46 and 48 and the isolation grooves 132 and 132' formed in the substrate 130 of this modified light shutter array 148 are also similar to those in each of the embodiments hereinbefore described.

In the light shutter array 148 shown in FIGS. 20A and 20B, a mask coating 150 is applied directly to the rows of shutter elements 134 and 134'. The mask coating 150 has two rows of square-shaped, apertures 152 and 152' each of which has an area generally conforming to one half of the total area of each of the shutter elements 134 and 134'. The apertures 152 and 152' thus formed in the mask coating 150 are arranged in staggering relationship between the rows of shutter elements 134 and 134' and are thus located in registry with the respective half areas of the individual shutter elements 134 and 134' of the light shutter array 128. Thus, each of the shutter elements 134 and 134' has its half area exposed through one of the apertures 152 and 152' in the mask coating 150. The light shutter array 148 is positioned between a polarizer 64 and an analyzer 66 in an image writing head assembly of the type illustrated in FIGS. 4A and 4B.

Figure 21A:
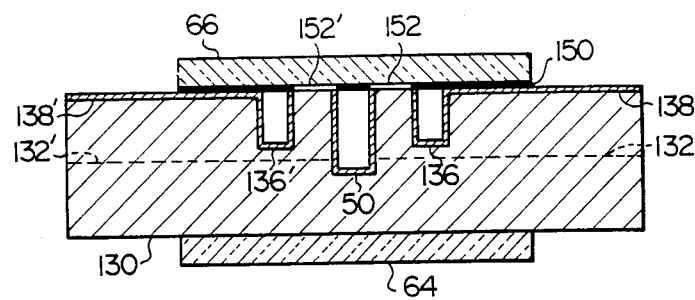
FIGS. 21A and 21B show further modifications of a device composed of the combination of a light shutter array and a mask plate in accordance with the present invention.
Figure 21B:
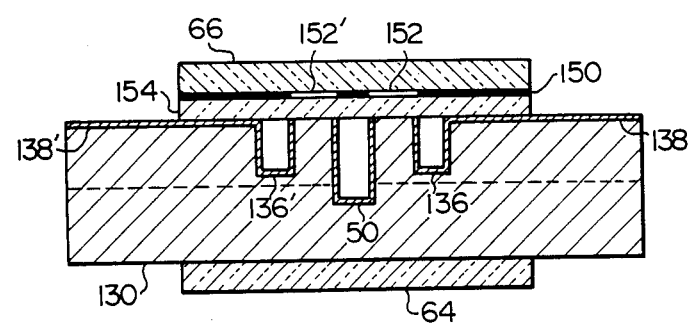

FIGS. 21A and 21B show further modifications of a device composed of the combination of a light shtter array and a mask plate. In the embodiment shown in FIG. 21A, the mask plate is implemented by an analyzer 66' having a mask coating 150 applied to its surface confronting the shutter array structure. While the mask plate is herein shown as being held in close contact with the shutter array structure, the mask plate formed by the analyzer 66' may be positioned at a spacing from the shutter array structure with the apertures 152 and 152' in the mask coating 150 located in registry with the shutter elements, respectively. It will be in this instance apparent that the mask plate may be implemented by a polarizer having a mask coating similarly to the analyzer 66' above described.

On the other hand, the embodiment illustrated in FIG. 21B is such that a mask plate is provided with a mask coating 150 applied to the outer surface of a transparent plate 154 which is held in contact with the shutter array structure. The analyzer 66 used in combination with such a mask plate may be positioned in close contact with the mask plate as shown or may be positioned at a spacing therefrom. The transparent plate 154 may also be positioned at a spacing from the shutter array structure. In the embodiment shown in FIG. 21B, the mask coating 150 may consist of an electrically conductive material such as aluminum or chromium.

Figure 22A:
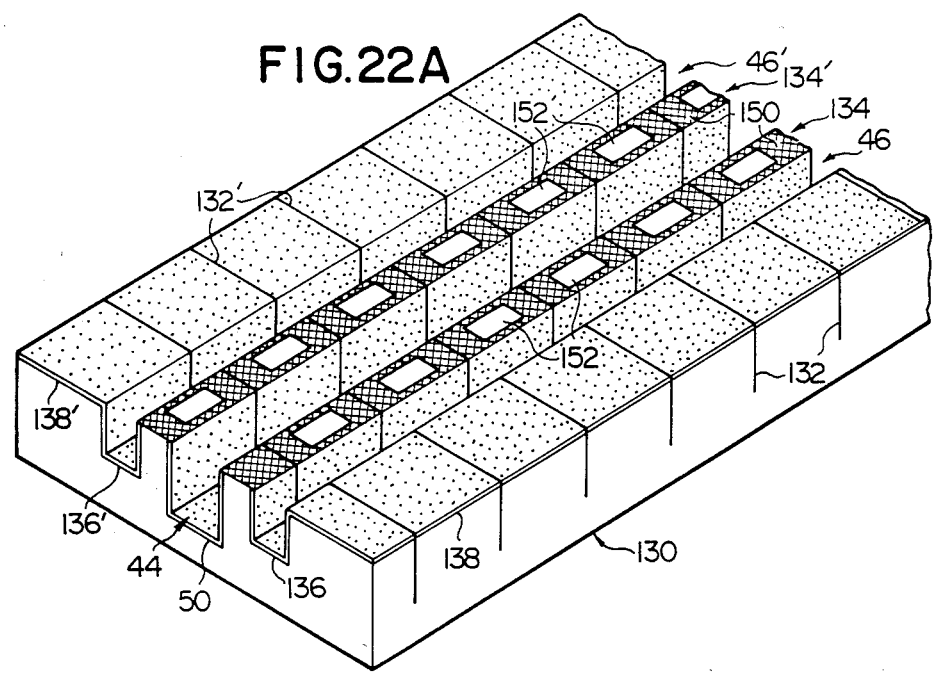
FIG. 22A is a fragmentary perspective view showing a portion of a modification of the light shutter array illustrated in FIGS. 21A and 21B.
Figure 22B:
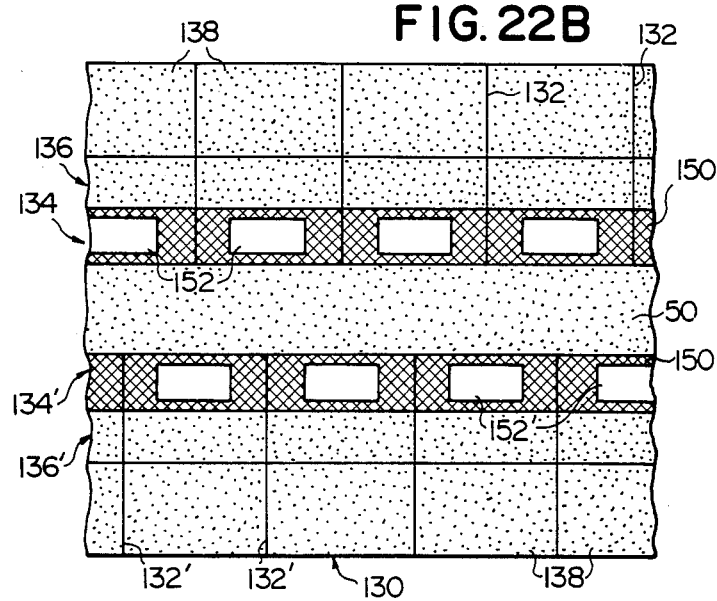
FIG. 22B is a fragmentary plan view of the light shutter array illustrated in FIG. 22A.

If desired, each of the apertures 152 and 152' in the mask coating 150 may be located centrally of each of the shutter elements 134 and 134' FIGS. 22A and 22B show a light shutter array in which the apertures 152 and 152' in the mask coating 150 are thus arranged.

Figure 23A:
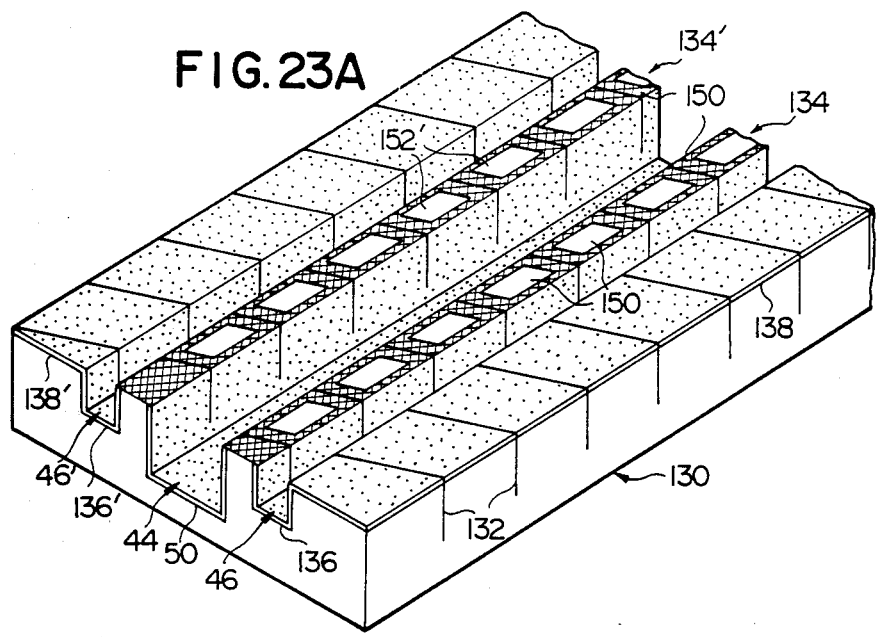
FIG. 23A is a fragmentary perspective view showing a portion of another modification of the light shutter array illustrated in FIGS. 21A and 21B.
Figure 23B:
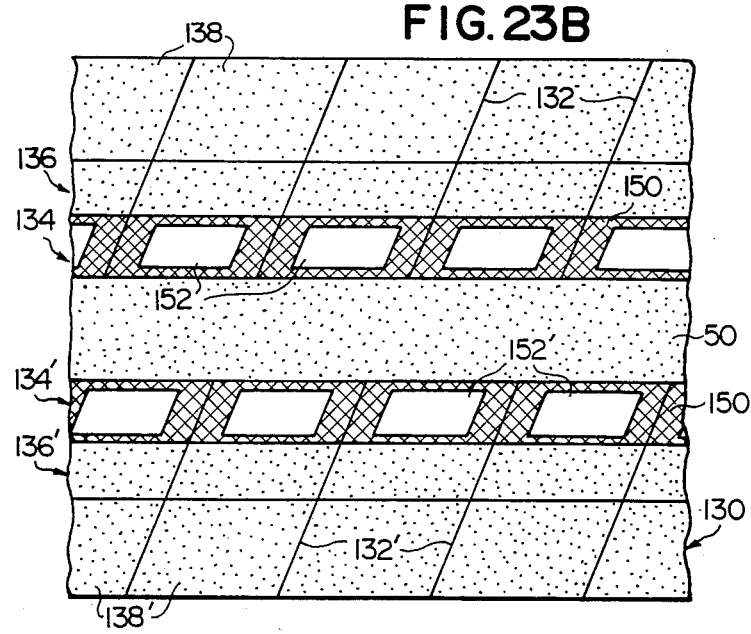
FIG. 23B is a fragmentary plan view of the light shutter array illustrated in FIG. 23A.

The light shutter array 148 described with reference to FIGS. 20A and 20B or FIGS. 22A and 22B may be further modified so that the individual shutter elements 134 and 134' thereof are also arranged similarly to their counterparts in the light shutter array 40 shown in FIGS. 3A to 3C, the light shutter array 104 shown in FIG. 8, the light shutter array 116 shown in FIGS. 12A and 12B, or the light shutter array shown in FIGS. 14A to 14C. FIGS. 23A and 23B show the arrangement in which a light shutter array similar in basic configuration to the light shutter array 148 shown in FIGS. 22A and 22B and modified to be largely similar to the light shutter array 104 shown in FIG. 8. In the light shutter array of the arrangement shown in FIGS. 23A and 23B, the isolation grooves 132 and 132' also extend at an angle less than 90 degrees to the center groove 44 so that each of the shutter elements 134 and 134' has a generally parallelogrammic cross section.

The features of a light shutter array forming part of an electrooptical light shutter device according to the present invention will be understood more clearly from the following examples of the present invention.

EXAMPLE I

A light shutter array having the features described with reference to FIGS. 3A to 3C was fabricated by this Example I. For the fabrication of such a light shutter array, an elongated blank of PLZT ceramic with optically polished opposite surfaces was first prepared as indicated at 84 in FIG. 24A. The PLZT blank 84 was of the composition 9/65/35, viz., $(Pb_{0.91}La_{0.09})(Zr_{0.65}Ti_{0.35})O_3$ and measured 100 mm in length, 2.29 mm in width and 0.5 mm in thickness. The directions in which the length and width the blank 84 were measured are herein referred to as directions X and Y, respectively, as shown. To this PLZT blank 84 was applied a coating 86 of a photoresist material such as chromium to an appropriate thickness. The photoresist coating 86 was then patterned using ordinary microphotolithographic techniques to leave a strip portion extending throughout the length of the blank 84 and having a width of 300 microns as shown in FIGS. 24B and 24C. While chromium was thus used to form the photoresist coating, any other type of photoresist material such as a polymeric photoresist may be used in lieu of chromium.

The center and side grooves 44, 46 and 46' were then cut into the PLZT blank 84 underneath the remaining photoresist coating 86 as indicated by phantom lines in FIG. 24C. For this purpose, the center groove 44 was first cut into the blank 84 along the longitudinal center line of the blank 84 to a width of 80 microns and a depth a of 150 microns from the surface of the blank 84 with use of a dicing saw with a diamond cutter blade having a blade thickness of 25 microns. In a like manner, the side grooves 46 and 46' were cut into the blank 84 each to a width of 80 microns and a depth b of 110 microns with a spacing of 80 microns left between the center groove 44 and each of the side grooves 46 and 46'. Rib portions 88 and 88' were thus formed respectively between the center groove 44 and one side groove 46 and between the center groove 44 and the other side groove 46'.

On the grooved surface of the blank 84 which now forms the substrate 42 was deposited an electrically conductive substance by ordinary sputtering techniques. Aluminum was deposited to form a conductive film 90 covering the whole surfaces of the substrate 42 including the top face of the photoresist coating 86 on each of the rib portions 88 and 88' as shown in FIG. 24D. Into the resultant substrate 42 were then cut a total of four sets of isolation grooves 56, 56', 58 and 58' with the individual isolation grooves of each set disposed at a pitch distance of 160 microns from one another. The isolation grooves 56, 56', 58 and 58' were formed to a depth c of 130 microns so that each of the isolation grooves had a bottom end below the bottom surfaces of the side grooves 46 and 46' and above the bottom surface of the center groove 44 as will be seen from FIG. 24E. The angle $\theta_1$ at which the isolation grooves 56 and 56' extend with respect to the center groove 44 was selected at 88 degrees, and the angle $\theta_2$ at which the isolation grooves 58 and 58' extend with respect to the center groove 44 was selected at 92 degrees. Such isolation grooves 56, 56', 58 and 58' were cut with use of a dicing saw with a diamond cutter blade having a blade thickness of 15 microns.

Each of the initial rib portions 88 and 88' was now sectioned into a number of discrete sections and, in addition, the conductive film 90 initially applied to the substrate 42 was divided into the control electrode segments 52 and 52' and lead electrode segments 54 and 54'. At this stage of fabrication, the photoresist coatings 108 on the shutter elements 48 and 48' were chemically removed so that the conductive film 90 covering each of the coatings 108 was lifted off. The shutter elements 48 and 48' now had their top faces allowed to be exposed so that there was obtained a light shutter array having the in-use shutter elements 60 and 60' and out-of-use shutter elements 62 and 62' each with an isoscelesly trapezoidal shutter window as shown in FIGS. 3A and 3B.

Figure 25:
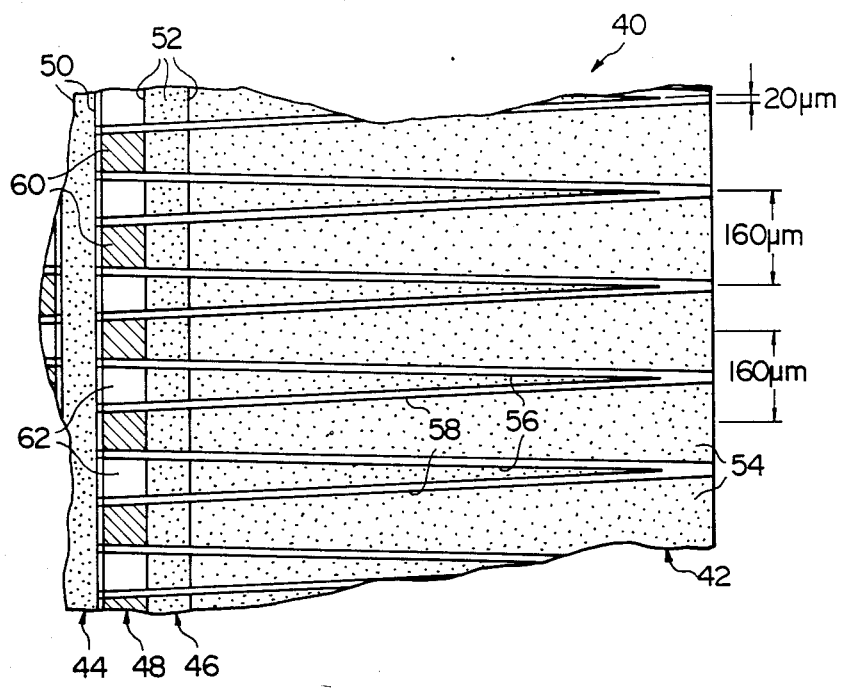
FIG. 25 is a fragmentary plan view showing a portion of the light shutter array illustrated in FIG. 3A.

The isolation grooves in the substrate 42 of the light shutter array thus fabricated oscillate in a zigzag pattern as previously described and, thus, form vertices each with an angle of 4 degrees ($\theta_2 - \theta_1$) at each of the parallel terminal edges of the substrate 42. Each of the in-use lead electrode segments having the trapezoidal areas has a width of 140 microns at each of the terminal edges of the substrate 42 with the pitch distance of 160 microns provided between the 20 micron wide isolation grooves of each set as shown in FIG. 25. On the other hand, each of the out-of-use lead electrode segments having the triangular areas is isolated by each of the isolation grooves from the in-use lead electrode segments and terminates short of the terminal edges of the substrate 42. Electrical connectors such as typically bonding wires can therefore be applied easily and efficiently to the in-use lead electrode segments by the use of an automated wire bonding equipment. While it is required that the soldering spots for producing connections from the lead electrode segments to such bonding wires have diameters of more than 100 microns on the average as well known in the art, the in-use lead electrode segments of the light shutter array fabricated as described have sufficient widths to accommodate such soldering spots at the terminal edges of the substrate 42. It may also be noted that the soldering spots produced on the adjacent ones of the lead electrode segments by means of an automated wire bonding equipment presently available can be separated reliably from one another with the lead electrode segments arranged at a center-to-center distance of 160 microns along the terminal edges of the substrate 42. Thus, the described arrangement of the lead electrode segments of the light shutter array provides assurance of freedom from an occurrence of cross-talk between the adjacent shutter elements and permits fabrication of the electrooptical light shutter devices using such arrays on a fully automated production line.

EXAMPLE II

A light shutter array having the features described with reference to FIG. 8 was fabricated by this Example II.

Figure 24A:
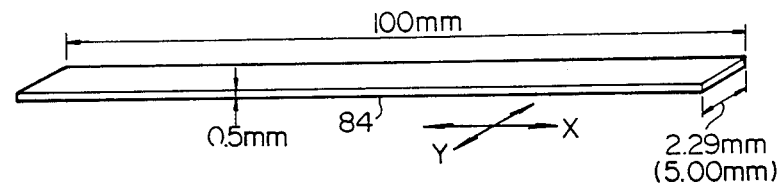
FIGS. 24A and 24B are perspective views each showing a blank of PLZT ceramic used in a process of fabricating the light shutter array illustrated in FIGS. 3A to 3C.
Figure 24B:
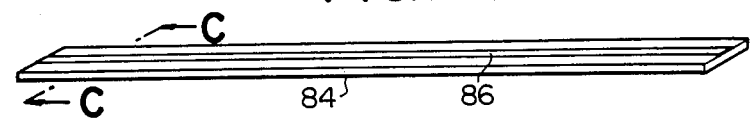
Figure 24C:
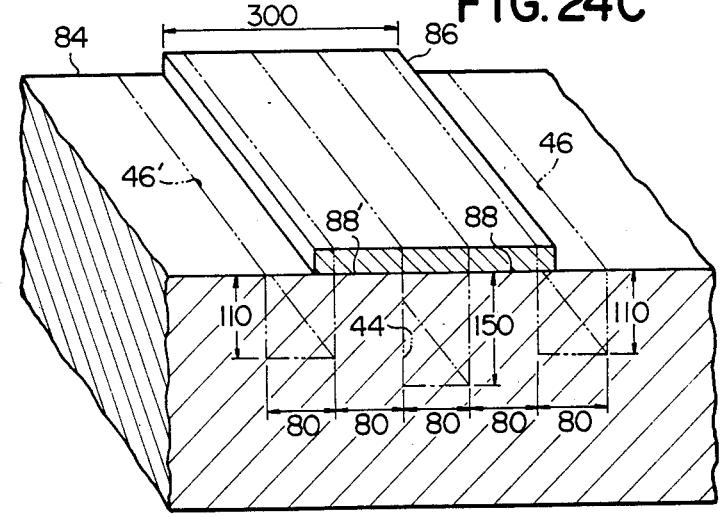
FIGS. 24C, 24D and 24E are fragmentary perspective views each showing a portion of the structure being fabricated from the blank shown in FIGS. 24A and 24B into the light shutter array shown in FIGS. 3A to 3C.
Figure 24D:
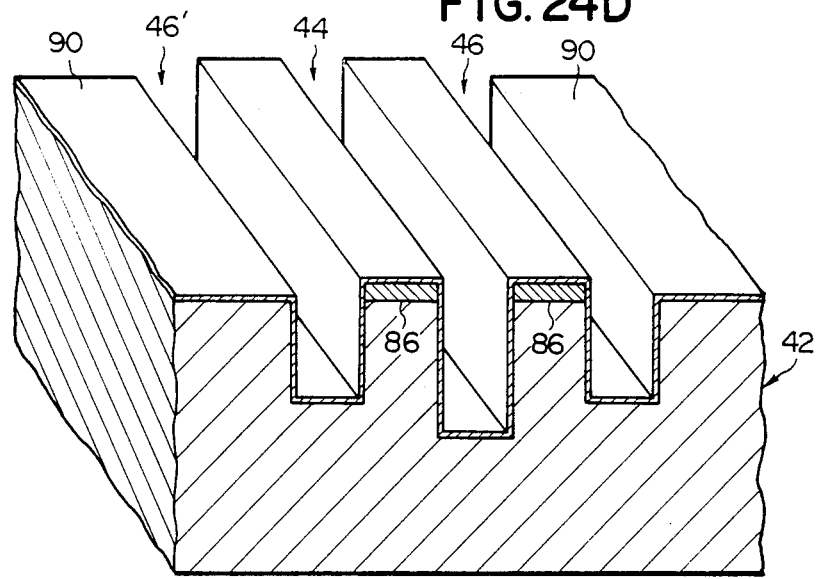
Figure 24E:
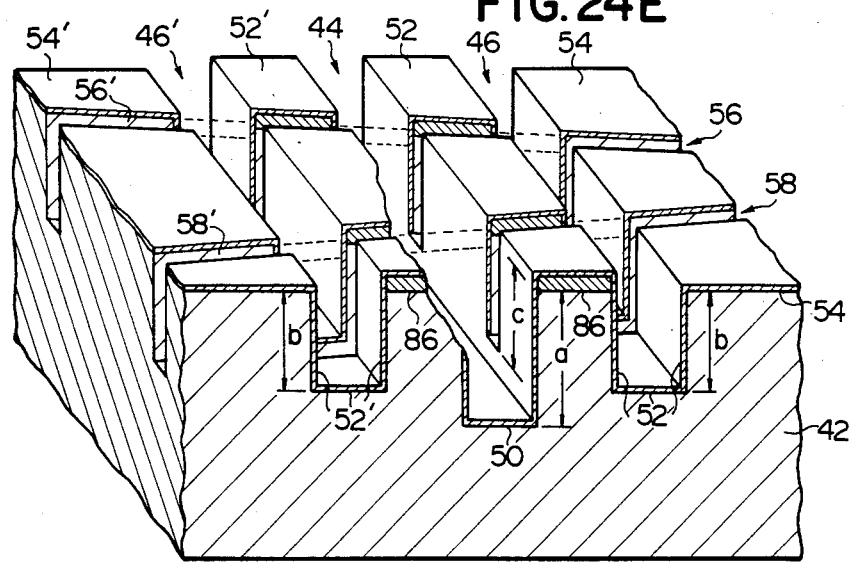

A blank of PLZT ceramic similar to but wider with a width of 5.0 mm than that shown in FIG. 24A was first prepared for the fabrication of such a light shutter array. A photoresist coating of chromium was applied to one optically polished surface of this blank to a thickness of 1 micron and was patterned similarly to the coating 86 on the blank shown in FIG. 24B. The center and side grooves 44, 46 and 46' similar to those by phantom lines in FIG. 24C were cut into the blank with use of a dicing saw with a diamond cutter blade having a blade thickness of 40 microns. On the grooved surface of the substrate thus prepared was then deposited an electrically conductive substance of aluminum to a thickness of, for example, 2 microns by ordinary sputtering techniques for forming a conductive film covering the whole surfaces of the substrate.

Into the resultant structure were then cut the two sets of isolation grooves 110 and 110' extending outwardly from the opposite side walls, respectively, of the center groove 44 at the angle of 63 degrees to the center groove 44. The individual isolation grooves 110/110' of each set were spaced apart a pitch distance of 160 microns from one another and were formed each to a depth (c) of 130 microns. Such isolation grooves 110 and 110' were cut with use of a dicing saw with a diamond cutter blade having a blade thickness of 50 microns. By these isolation grooves 110 and 110', the rib portions which had been formed between the center groove 44 and side grooves 46 and 46' were now sectioned into the shutter elements 108 and 108'. Similarly, the conductive film outside the center groove 44 was sectioned into the two sets of control electrode segments 112 and 112' and two sets of lead electrode segments 114 and 114'. After the isolation grooves 110 and 110' were thus cut into the substrate, the photoresist coatings on the shutter elements 108 and 108' were chemically removed so that the conductive film covering each of the coatings 108 was lifted off. The shutter elements 108 and 108' now had their top faces allowed to be exposed so that a light shutter array having the parallelogrammic shutter windows of the shutter elements 108 and 108' as shown in FIG. 8 was obtained.

EXAMPLE III

Figure 26:
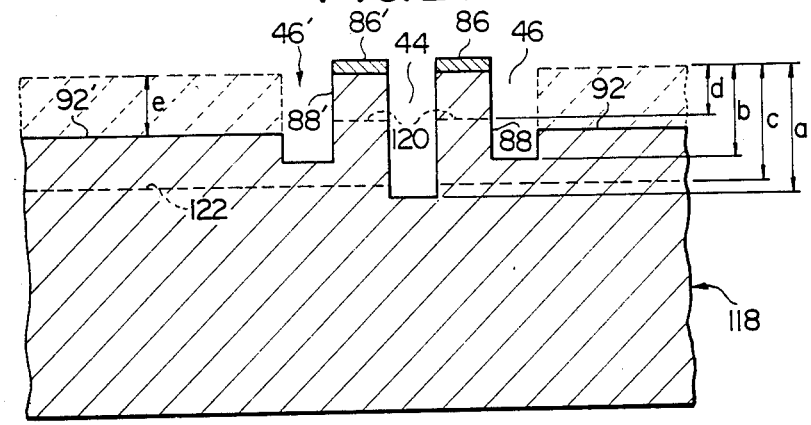
FIG. 26 is a sectional view taken along line XXVI—XXVI in FIG. 12A.

A light shutter array having the features described with reference to FIGS. 12A and 12B was fabricated by this Example III. Such a light shutter array was fabricated from an elongated blank of PLZT ceramic similar to that used in Example II. In the case of this Example III, a photoresist coating of chromium was applied to the entire area of one surface of the blank to a thickness of 0.5 micron (2000 Å). The center and side grooves 44, 46 and 46' were then cut into the blank with use of a dicing saw with a diamond cutter blade having a blade thickness of 40 microns. The center groove 44 was cut to a width of 100 microns and a depth a of 160 microns while the side grooves 46 and 46' was cut each to a width of 80 microns and a depth b of 120 microns as shown in FIG. 26. The side grooves 46 and 46' were spaced apart from the center groove 44 to form a pair of rib portions 88 and 88' each having a width of 60 microns.

Roughened planar depressions 92 and 92' were then formed into the substrate 118 to a depth e of 80 microns as shown in FIG. 26 throughout the areas of the substrate 118 extending outwardly from the side grooves 46 and 46' to the terminal edges of the substrate 118 and covered with the photoresist coating. For this purpose, a multiplicity of parallel grooves were cut into the surfaces of the substrate 118 outside the side grooves 46 and 46' in such a manner that the grooves are sidewise conjoined from one to another. These parallel grooves were cut at a pitch distance of 30 microns with use of the same dicing saw that were used for the cutting of the grooves 44, 46 and 46'. The depressions 92 and 92' thus formed were completely clear of the photoresist coating and had rough surfaces which resulted from the sidewise conjoined grooves. At this stage of the fabrication process, the photoresist coating initially applied to the substrate 118 was left only on the top faces of the shutter elements 108 and 108' as indicated at 86 and 86' in FIG. 26.

On the grooved surface of the substrate 118 was then deposited an electrically conductive substance of aluminum to a thickness of 4 microns by a two-stage sputtering process consisting of reverse or sputter etching and ordinary sputtering steps. The sputter etching step was performed with use of an RF power of 100 watts for 2 minutes within a chamber vacuumized to $5 \times 10^{-2}$ Torr, and the subsequent sputtering step was performed with use of a dc power of 1 ampere $\times$ 500 volts for 20 minutes within a chamber vacuumized to $5 \times 10^{-3}$ Torr. The use of the sputter etching step in addition to the formation of the depressions 92 and 92' with the rough surfaces contributes to strengthening the cohesion between the substrate 118 and the conductive film formed thereon.

Figure 27:
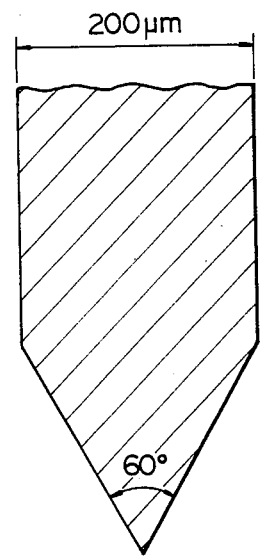
FIG. 27 is a fragmentary cross sectional view showing an edge portion of the diamond cutter blade of a dicing saw which may be used for the formation of the isolation grooves in the light shutter array illustrated in FIGS. 12A, 12B and 26.

Into the resultant substrate 118 were then cut the groove portions 120 and 120' in the rib portions 88 and 88', respectively. These groove portions 120 and 120' were cut with use of a dicing saw with a diamond cutter blade having a blade thickness of 200 microns and an edge with a V-shaped cross section having a 60-degree edge angle as shown in FIG. 27. The groove portions 120/120' in each of the shutter elements 108 and 108' extended at an angle of 64 degrees to the center groove 44 and were formed at a pitch distance of 144 microns and to a depth d of 60 microns from the top faces of the shutter elements 108 and 108' and a width of 72 microns.

Figure 28:
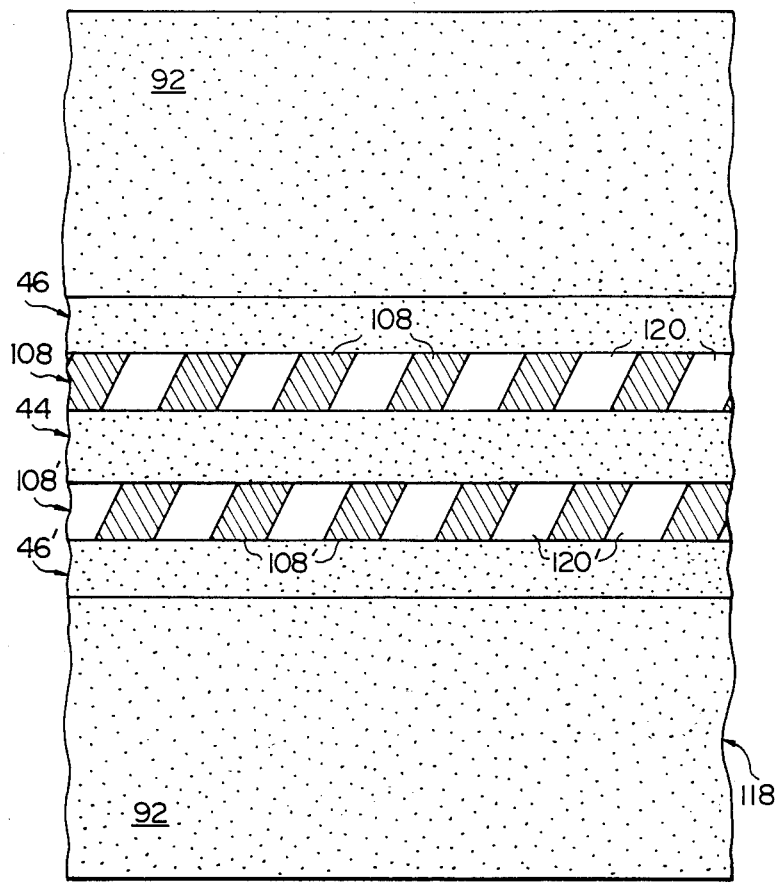
FIG. 28 is a view largely similar to FIG. 12A but shows a structure produced during a process of fabricating the light shutter array of FIGS. 12A and 12B from a ceramic blank.

The rib portions 88 and 88' were now sectioned into the rows of shutter elements 108 and 108' each having a parallelogrammic cross section with a width of 72 microns. FIG. 28 shows the structure thus formed with the groove portions 120 and 120' respectively in the rows of the shutter elements 108 and 108', wherein the areas over which the conductive film was applied to the substrate 118 are shown at 92 and 92', respectively.

Into the substrate 118 were then cut the isolation grooves 122 within one half area of the substrate 118 and the isolation grooves 122' within the other half area of the substrate 118. The isolation grooves 122 and 122' were are cut so that the grooves 122 extended through the side groove 46 and groove portions 120, respectively, and the grooves 122' extended through the side groove 46' and groove portions 120'. Such isolation grooves 122 and 122' were formed to a width of 20 microns and a depth c of 140 microns which was larger than the depth b of 120 microns of the side grooves 46 and 46' and the depth d of 60 microns of the groove portions 120 and 120'. The depth c of 140 microns of the isolation grooves 122 and 122' being less than the depth a of 160 microns of the center groove 44, the bottom surface of the common electrode 50 was maintained intact and thus remained continuous throughout its length. A dicing saw with a diamond cutter blade with a blade thickness of 15 microns were used for the cutting of the isolation grooves 122 and 122'.

After the isolation grooves 122 and 122' were cut into the substrate 118, the photoresist coatings 86 remaining on the shutter elements 108 and 108' as shown in FIG. 26 were chemically removed so that the conductive film covering each of the coatings 108 was lifted off. The shutter elements 108 and 108' now had their top faces allowed to be exposed so that the parallelogrammic shutter windows of the shutter elements 108 and 108' appeared as shown in FIG. 12A.

EXAMPLE IV

A light shutter array having the features described with reference to FIGS. 14A to 14C was fabricated by this Example IV. Such a light shutter array was also fabricated from an elongated blank of PLZT ceramic similar to that used in Example II. In the case of this Example IV, a photoresist coating of chromium was applied to ne surface of the blank to a thickness of 1 micron and was patterned to a width of 300 microns. The center and side grooves 44, 46 and 46' were then cut into the blank with use of a dicing saw with a diamond cutter blade having a blade thickness of 40 microns. The center groove 44 was cut to a width of 90 microns and a depth a of 150 microns while the side grooves 46 and 46' were cut each to a width of 80 microns and a depth b of 110 microns. The side grooves 46 and 46' were spaced apart from the center groove 44 to form a pair of rib portions each with a width of 80 microns between the center groove 44 and side grooves 46 and 46', respectively.

Figure 29:
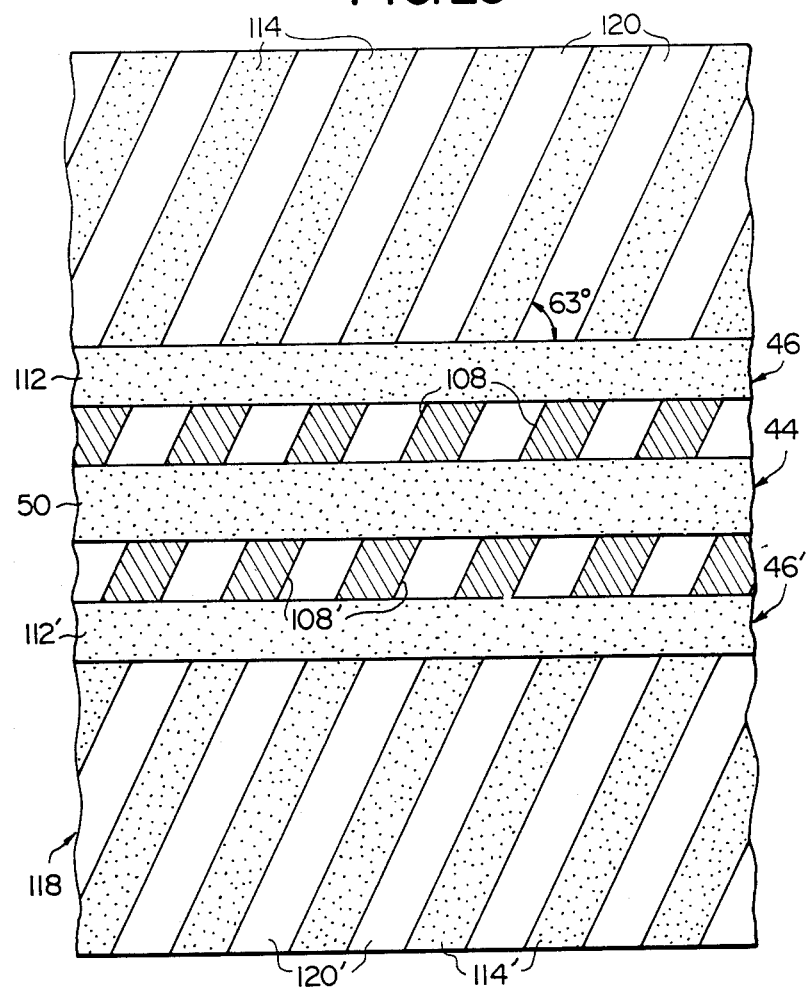
FIG. 29 is a view generally similar to FIG. 14A but shows a structure produced during a process of fabricating the light shutter array of FIGS. 14A to 14C from a PLZT ceramic blank.

On the grooved surface of the substrate 118 was then deposited an electrically conductive substance of aluminum to a thickness of 2 microns by a sputtering process. Into the resultant structure were cut the groove portions 120 and 120' extending through the rib portions and the areas of the substrate 118 outside the side grooves 46 and 46', respectively, at an angle $\theta$ of 63 degrees to the center and side grooves 44, 46 and 46' as shown in FIG. 29. These groove portions 120 and 120' were cut each to a width of 76 microns and a depth d of 40 microns and at a pitch distance of 152 microns from one another with use of a dicing saw with a diamond cutter blade having a blade thickness of 50 microns. A dicing saw having such a cutter blade produces a groove with a width of about 55 microns to 60 microns by a single travel on the substrate 118 so that each of the groove portions 120 and 120' of the width of 76 microns could be formed by two travels of the saw. As noted previously, the depth d to which the groove portions 120 and 120' are to be cut into the substrate 118 is preferably selected to be less than about 52 microns to 60 microns. The rib portions between the center groove 44 and side grooves 46 and 46' were now sectioned into the rows of shutter elements 108 and 108', respectively each having a width of 152 microns along the grooves 44, 46 and 46' as shown in FIG. 29.

Into the substrate 118 were then cut the isolation grooves 122 and 122' extending respectively from the side walls of the center groove 44 to the terminal edges of the substrate 118. These isolation grooves 122 and 122' were cut to a width of about 25 microns and a depth c of 130 microns which was larger than the depth 110 microns (b) of the side grooves 46 and 46' and the depth 40 microns (d) of the groove portions 120 and 120'. Such isolation grooves 122 and 122' were be cut with use of a dicing saw with a diamond cutter blade having a blade thickness of 15 microns. After the isolation grooves 122 and 122' were thus cut into the substrate 118, the photoresist coatings on the shutter elements 108 and 108' were chemically removed so that the conductive film covering each of the coatings was lifted off with the result that a light shutter array having the shutter elements 108 and 108' each with a parallelogrammic shutter window as shown in FIG. 14A was obtained.

EXAMPLE V

Figure 30A:
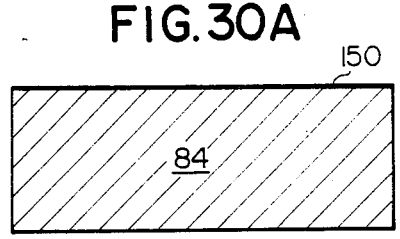
FIGS. 30A to 30F are cross sectional views of a PLZT ceramic blank or substrate at various steps of a process of fabricating the light shutter array of FIGS. 21A and 21B.
Figure 30B:
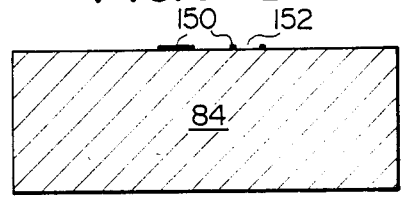
Figure 30C:
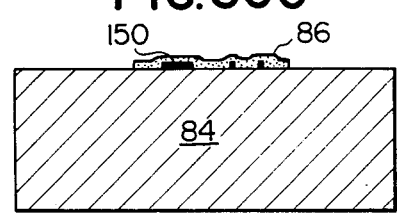
Figure 30D:
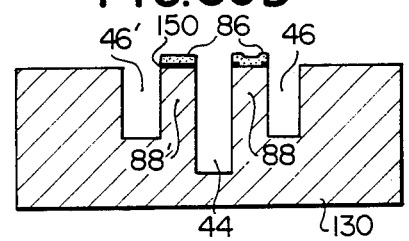
Figure 30E:
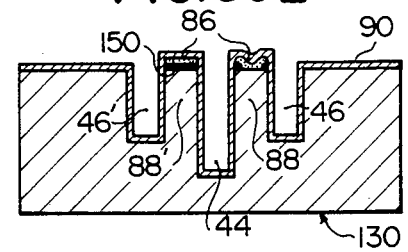

A light shutter array having the features described with reference to FIGS. 18A and 18B A blank 84 of PLZT ceramic similar to that shown in FIG. 24A was also used for the fabrication of such a light shutter array. A coating 150 of a black-colored photosensitive emulsion was applied to one optically polished surface of this blank 84 to an appropriate thickness as shown in FIG. 30A and was patterned similarly to the mask coating 150 on the substrate 130 shown in FIG. 18A as indicated in FIG. 30B by photolithographic techniques. A coating 86 of a photoresist material of, for example, a thermosetting polymeric resin was then applied to the blank 84 in such a manner that the photoresist coating 86 covers the patterned mask coating 150 and some areas of the blank surrounding the mask coating 150 as shown in FIG. 30C. After photoresist was thermally set, the center and side grooves 44, 46 and 46' were cut into the blank 84 as shown in FIG. 30D in a manner similar to that used in Example I. On the grooved surface of the substrate 130 thus prepared was then deposited an electrically conductive substance of aluminum by, for example, vacuum deposition techniques for forming a conductive film 90 covering the whole surfaces of the substrate 130 as shown in FIG. 30E. Into the resultant structure were then cut the two sets of isolation grooves 132 and 132' (FIG. 30F) extending outwardly from the opposite side walls, respectively, of the center groove 44 at right angles to the center groove 44.

Figure 30F:
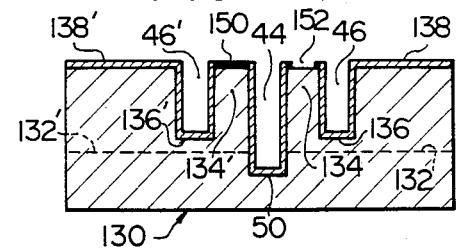

The rib portions which had been formed between the center groove 44 and side grooves 46 and 46' were now sectioned into the shutter elements 134 and 134'. Similarly, the conductive film 90 outside the center groove 44 was sectioned into the two sets of control electrode segments 136 and 136' and two sets of lead electrode segments 138 and 138'. After the isolation grooves 132 and 332' were thus cut into the substrate 130, the photoresist coatings 108 on the shutter elements 108 and 108' were chemically removed so that the conductive film 90 covering each of the coatings 108 was lifted off. The shutter elements 134 and 134' now had their top faces allowed to be exposed with one half area of each shutter element covered with the mask coating 150 and the other half area exposed through the aperture 152/152' in the coating 150 as indicated in FIG. 30F.

What is claimed is:

1. An electrooptical light shutter device for use in an optical printer apparatus, said device comprising:
    a number of shutter elements arranged in the form of a linear array, each of said shutter elements forming a part of a strip of material having an electrooptical effect and being provided in the form of a bock defined by a plurality of grooves which includes a first groove extending in parallel with the direction in which said shutter elements are arranged, a second groove deeper than said first groove and extending in parallel with the direction in which said shutter elements are arranged, and a plurality of third grooves deeper than said first groove, shallower than said second groove, and extending in a skewing relationship to the direction in which said shutter elements are arranged, each of said shutter elements being provided with a pair of electrode segments provided in said first groove and second groove, respectively;
    a polarizer disposed on a light-incoming side of the array of said shutter elements, and
    an analyzer disposed on a light-outgoing side of the array of said shutter elements, wherein said shutter elements have respective shutter windows through which light is to be passed selectively.

2. An electrooptical light shutter device as set forth in claim 1, in which said material is composed of a PLZT ceramic.

3. An electrooptical light shutter device as set forth in claim 1, in which each of said shutter elements has a parallelogramic shutter window.

4. An electrooptical light shutter device as set forth in claim 1, in which each of said shutter elements has a trapezoidal shutter window.

5. An electrooptical light shutter device as set forth in claim 1, further comprising mask means for masking each of said shutter elements to define the shutter window thereof.

6. An electrooptical light shutter device as set forth in claim 5, in which said mask means is provided separately of said shutter elements.

7. An electrooptical light shutter device as set forth in claim 5, in which said mask means comprises a coating applied to each of said shutter elements.

8. An electrooptical light shutter device as set forth in claim 5, in which each of said shutter elements has an effective area which consists of halves juxtaposed in the direction in which said shutter elements are arranged, each of said halves being equal to the area of each of said shutter windows.

9. An electrooptical light shutter device as set forth in claim 1, in which said shutter elements are arranged in two arrays.

10. An electrooptical light shutter device for use in an optical printer apparatus, said device comprising:
- a number of shutter elements arranged in the form of a linear array, each of said shutter elements forming a part of a strip of material having an electrooptical effect and being provided in the form of a block defined by a plurality of grooves including those extending in parallel with the direction in which said shutter elements are arranged and those extending in an intersecting relationship to the direction in which said shutter elements are arranged, said block forming each of said shutter elements having a bevelled recess at the edge thereof;
- a polarizer disposed on a light-incoming side of the array of said shutter elements, and
- an analyzer disposed on a light-outgoing side of the array of said shutter elements, wherein said shutter elements have respective shutter windows through which light is to be passed selectively.

11. An electrooptical light shutter device as set forth in claim 10, in which said material is composed of a PLZT ceramic.

12. An electrooptical light shutter device as set forth in claim 10, in which each of said shutter elements has a parallelogramic shutter window.

13. An electrooptical light shutter device as set forth in claim 10, in which each of said shutter elements has a trapezoidal shutter window.

14. An electrooptical light shutter device for use in an optical printer apparatus, said device comprising:
- a number of shutter elements arranged in the form of a linear array, each of said shutter elements forming a part of a strip of material having an electrooptical effect and being provided in the form of a block defined by a plurality of grooves including those extending in parallel with the direction in which said shutter elements are arranged and those extending in an intersecting relationship to the direction in which said shutter elements are arranged, said block forming each of said shutter elements having a rectangular recess at the edge thereof;
- a polarizer disposed on a light-incoming side of the array of said shutter elements, and
- an analyzer disposed on a light-outgoing side of the array of said shutter elements, wherein said shutter elements have respective shutter windows through which light is to be passed selectively.

15. An electrooptical light shutter device as set forth in claim 14, in which said material is composed of a PLZT ceramic.

16. An electrooptical light shutter device as set forth in claim 14, in which each of said shutter elements has a parallelogramic shutter window.

17. An electrooptical light shutter device as set forth in claim 14, in which each of said shutter elements has a trapezoidal shutter window.

18. An electrooptical light shutter device for use in an optical printer apparatus, said device comprising:
- an elongated strip of material having an electrooptical effect, the strip being formed with grooves which define a number of shutter elements each in the form of a block, said grooves including a first set of grooves consisting of three grooves extending longitudinally of said elongated strip to define said shutter elements in two parallel linear arrays, and a second set of grooves extending in a skewing relationship to said first set of grooves;
- a polarizer disposed on a light-incoming side of the array of said shutter elements, and
- an analyzer disposed on a light-outgoing side of the array of said shutter elements, wherein one of said three grooves of the first set of grooves is deeper than the remaining two of the three grooves, and said second set of grooves is shallower than the deepest one of said three grooves and deeper than the remaining two of the three grooves.

19. An electrooptical light shutter device as set forth in claim 18, in which said elongated strip is constructed of a PLZT ceramic.

20. An electrooptical light shutter device as set forth in claim 18, in which the grooves in said second set of grooves are parallel with each other.

21. An electrooptical light shutter device as set forth in claim 18, in which each of said shutter elements has a pair of electrode segments, one of the segments is provided within the deepest one of said three grooves and the other is provided within one of the remaining two of said three grooves.

22. An electrooptical light shutter device as set forth in claim 21, in which said electrode segments provided within the deepest one of said three grooves is associated commonly to said shutter elements.

23. An electrooptical light shutter device as set forth in claim 18, in which each of said shutter elements consists of a block which has a bevelled recess at the edge thereof.

24. An electrooptical light shutter device as set forth in claim 19, in which each of said shutter elements consists of a block which has a rectangular recess at the edge thereof.

25. An electrooptical light shutter device for use in an optical printer apparatus, said device comprising:
- an elongated strip of material having an electrooptical effect, the strip being formed with grooves which define a number of shutter elements each in the form of a block, said grooves including a first set of grooves extending longitudinally of said elongated strip, and a second set of grooves extending in a skewing relationship to said first set of grooves, each of said shutter elements consisting of a block which has a bevelled recess at the edge thereof;
- a polarizer disposed on a light-incoming side of the array of said shutter elements, and
- an analyzer disposed on a light-outgoing side of the array of said shutter elements.

26. An electrooptical light shutter device as set forth in claim 25, in which said elongated strip is constructed of a PLZT ceramic.

27. An electrooptical light shutter device as set forth in claim 25, in which the grooves in said second set of grooves are parallel with each other.

28. An electrooptical light shutter device for use in an optical printer apparatus, said device comprising:
- an elongated strip of material having an electrooptical effect, the strip being formed with grooves which define a number of shutter elements each in the form of a block, said grooves including a first set of grooves extending longitudinally of said elongated strip, and a second set of grooves extending in a skewing relationship to said first set of grooves, each of said shutter elements consisting of a block which has a rectangular recess at the edge thereof;

a polarizer disposed on a light-incoming side of the array of said shutter elements, and an analyzer disposed on a light-outgoing side of the array of said shutter elements.

29. An electrooptical light shutter device as set forth in claim 28, in which said elongated strip is constructed of a PLZT ceramic.

30. An electrooptical light shutter device as set forth in claim 28, in which the grooves in said second set of grooves are parallel with each other.

31. In an electrooptical light shutter for selectively providing segments of light from a source of light by the application of an electrical field to corresponding projections, the improvement comprising:

an elongated base plate supporting a predetermined number of projections aligned longitudinally thereof, each projection being segregated from adjacent projections by a series of grooves, the grooves including a first groove extending longitudinally of the plate, a second groove positioned parallel to said first groove by a predetermined distance, said second groove having a smaller depth than said first groove, and a plurality of third grooves extending in a skewing relationship to said first and second grooves and having a smaller depth than said first groove but a larger depth than said second groove, and means associated with said first and second grooves to apply the electrical field.

32. A method for composing an electrooptical light shutter, comprising the steps of:

forming a first groove and a second groove extending longitudinally of an elongated plate having an electrooptical effect, said second groove having a smaller depth than said first groove and parallel to said first groove, said second groove being separated from said first groove by a predetermined distance;

providing an electrrode material on the entire surface of said plate;

providing a plurality of projections which are taken off the electrode material thereon and aligned longitudinally of the plate by forming a plurality of third grooves having a smaller depth than said first groove but a larger depth then said second groove in a skewing relationship to said first and second grooves, and connecting a drive circuit which applies an electrical field to the projections selectively to the electrode provided on the wall of said first groove for the plurality of projections in common and the electrodes provided on the wall portions of said second groove corresponding to the respective projections individually.

33. A method for composing an electrooptical light shutter, comprising the steps of:

forming a first groove and a second groove extending longitudinally of an elongated plate having an electrooptical effect, said second groove parallel to said first groove separated from said first groove by a predetermined distance;

providing a plurality of projections which are aligned longitudinally of the plate by forming a plurality of third grooves in an intersecting relationship to said first and second grooves, and cutting off the edge of each projection to form a bevelled recess thereat.

34. A method for composing an electrooptical light shutter, comprising the steps of:

forming a first groove and a second groove extending longitudinally of an elongated plate having an electrooptical effect, said second groove parallel to said first groove separated from said first groove by a predetermined distance;

providing a plurality of projections which are aligned longitudinally of the plate by forming a plurality of third grooves in an intersecting relationship to said first and second grooves, and cutting off the edge of each projection to form a bevelled recess thereat.

* * * * *